(12) United States Patent
Nako et al.

(10) Patent No.: US 9,956,650 B2
(45) Date of Patent: May 1, 2018

(54) WELD METAL HAVING EXCELLENT RESISTANCE TO HYDROGEN EMBRITTLEMENT

(71) Applicant: Kobe Steel, Ltd., Kobe-shi (JP)

(72) Inventors: Hidenori Nako, Kobe (JP); Takuya Kochi, Kobe (JP); Wataru Urushihara, Kobe (JP); Munenobu Sato, Fujisawa (JP); Yoshihiko Kitagawa, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 215 days.

(21) Appl. No.: 14/370,877

(22) PCT Filed: Feb. 25, 2013

(86) PCT No.: PCT/JP2013/054677
§ 371 (c)(1),
(2) Date: Jul. 7, 2014

(87) PCT Pub. No.: WO2013/129284
PCT Pub. Date: Sep. 6, 2013

(65) Prior Publication Data
US 2014/0377123 A1 Dec. 25, 2014

(30) Foreign Application Priority Data
Feb. 27, 2012 (JP) .................... 2012-040603

(51) Int. Cl.
| | | |
|---|---|---|
| B23K 35/24 | (2006.01) | |
| B23K 35/30 | (2006.01) | |
| B23K 9/173 | (2006.01) | |
| B23K 9/23 | (2006.01) | |
| B23K 35/02 | (2006.01) | |
| B23K 9/025 | (2006.01) | |
| B23K 33/00 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/08 | (2006.01) | |
| C22C 38/12 | (2006.01) | |
| C22C 38/14 | (2006.01) | |
| C22C 38/16 | (2006.01) | |
| C22C 38/44 | (2006.01) | |
| C22C 38/50 | (2006.01) | |
| C22C 38/58 | (2006.01) | |
| B23K 103/04 | (2006.01) | |

(52) U.S. Cl.
CPC ......... *B23K 35/3093* (2013.01); *B23K 9/025* (2013.01); *B23K 9/173* (2013.01); *B23K 9/23* (2013.01); *B23K 33/004* (2013.01); *B23K 35/0255* (2013.01); *B23K 35/0266* (2013.01); *B23K 35/3053* (2013.01); *B23K 35/3066* (2013.01); *B23K 35/3073* (2013.01); *B23K 35/3086* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/44* (2013.01); *C22C 38/50* (2013.01); *C22C 38/58* (2013.01); *B23K 2203/04* (2013.01); *C21D 2211/001* (2013.01)

(58) Field of Classification Search
CPC ............ B23K 35/3066; B23K 35/3053; B23K 35/3093; B23K 9/173
USPC .................................................. 219/137 WM
See application file for complete search history.

(56) References Cited

U.S. PATENT DOCUMENTS

| | | | |
|---|---|---|---|
| 2005/0016980 A1 | 1/2005 | Hara et al. | |
| 2005/0155960 A1* | 7/2005 | Bonnet ............. | B23K 26/1429 219/137 WM |
| 2010/0119861 A1 | 5/2010 | Hayakawa et al. | |
| 2011/0250471 A1 | 10/2011 | Hara et al. | |

FOREIGN PATENT DOCUMENTS

| | | |
|---|---|---|
| JP | 11 147196 | 6/1999 |
| JP | 2002 115032 | 4/2002 |
| JP | 2003 33876 | 2/2003 |
| JP | 2005 40816 | 2/2005 |
| JP | 2007-152369 A | 6/2007 |
| JP | 2008 808 | 1/2008 |
| WO | 2008 123329 | 10/2008 |
| WO | 2012 105617 | 8/2012 |

OTHER PUBLICATIONS

International Search Report and Written Opinion dated May 14, 2013 in PCT/JP13/054677 Filed Feb. 25, 2013.

* cited by examiner

*Primary Examiner* — Weiping Zhu
(74) *Attorney, Agent, or Firm* — Oblon, McClelland, Maier & Neustadt, L.L.P.

(57) ABSTRACT

The present invention is a weld metal formed by gas shielded arc welding using a flux cored wire, the welded metal having a predetermined chemical composition, residual austenite particles being present in an amount of at least 2500 particles/mm$^2$, and the volume fraction of residual austenite particles being at least 4.0%.

14 Claims, 3 Drawing Sheets

F I G . 1
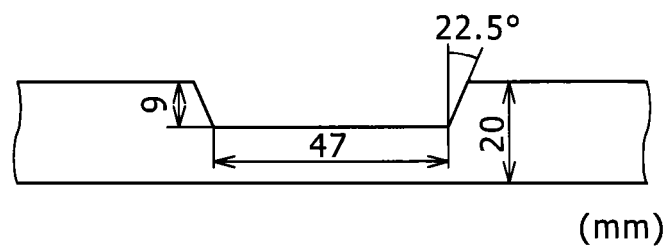
(mm)
F I G . 2
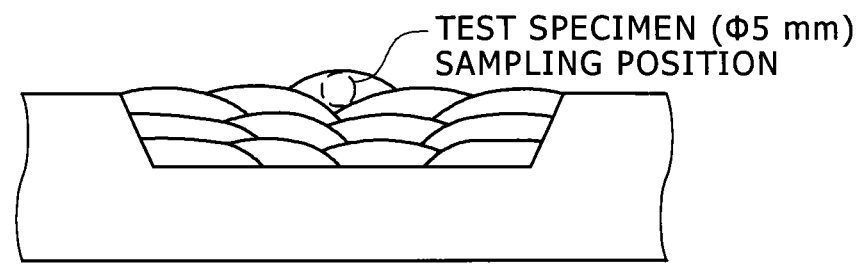

F I G . 3
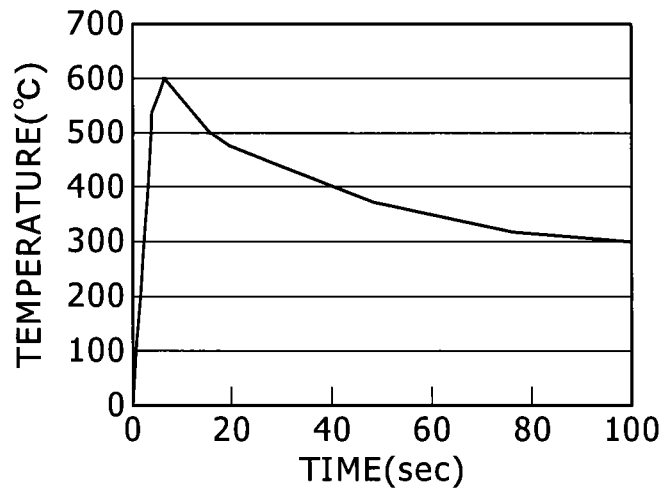
F I G . 4
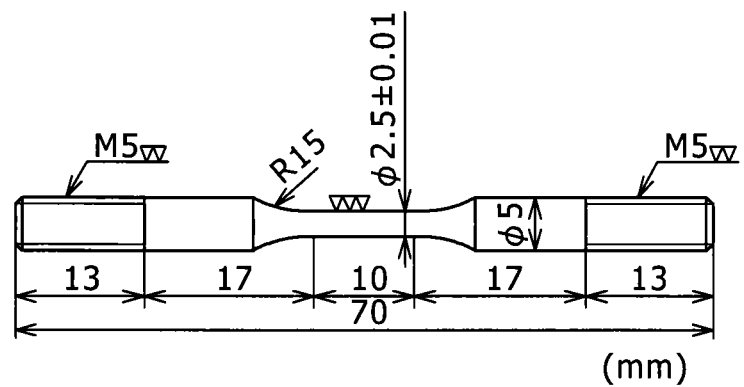

WELD METAL HAVING EXCELLENT RESISTANCE TO HYDROGEN EMBRITTLEMENT

TECHNICAL FIELD

The present invention relates to a weld metal to be used for a welded structure, the weld metal having excellent resistance to hydrogen embrittlement, i.e., having reduced susceptibility to hydrogen embrittlement. In detail, the invention relates to a weld metal having excellent resistance to hydrogen embrittlement and preferably having excellent low-temperature toughness not only in the case of using a small test specimen but also in the case of using a large test specimen, in which a weld metal includes a relatively large number of structural weakened portions, for evaluation of the resistance to hydrogen embrittlement using SSRT (Slow Strain Rate Technique).

BACKGROUND ART

In welding of high tensile steel, preheating/interpass temperature must be strictly managed from the viewpoint of preventing low-temperature cracking of a weld metal portion, which is a cause of low operation efficiency. Recently, steel to be used for a welded structure has increasingly higher strength, and a weld metal is accordingly required to have higher strength (for example, HT780: 780 MPa class high strength steel).

Such increased strength tends to lower resistance to low-temperature cracking. The resistance to low-temperature cracking is therefore necessary to be improved. In particular, since gas shielded arc welding using a flux cored wire is excellent in welding workability, a technique for securing the resistance to low-temperature cracking is required for a weld metal formed by the gas shielded arc welding.

Such low-temperature cracking is estimated to be caused by diffusible hydrogen that is segregated in grain boundaries and lowers grain boundary strength, (hereinafter, this is referred to as "hydrogen embrittlement"). How to decrease the diffusible hydrogen is therefore an important point to improve the resistance to low-temperature cracking.

Consequently, susceptibility to hydrogen embrittlement of weld metal must be lowered in order to improve the resistance to low-temperature cracking of the weld metal. Various techniques have been therefore proposed.

For example, PTL 1 discloses a technique that prevents low-temperature cracking by dispersing Mo carbide particles (carbide particles containing Mo) having high hydrogen trap ability in a weld metal. However, this technique must adopt a special welding method in order to disperse the Mo carbide particles. That is, steel pieces must be butted together and then jointed from the inside by submerged arc welding. Hence, the technique is not applicable for typical welding of steel.

PTL 2 proposes a technique that prevents the low-temperature cracking by controlling cooling time during welding operation. This technique requires strict operation control depending on components, and thus has a problem of a high work load.

PTL 3 proposes a technique that prevents the low-temperature cracking by adjusting a fraction of retained austenite, which traps diffusible hydrogen, to 1% or more in a weld metal. However, this technique is based on double one layer seam welding of a steel pipe, and is therefore inapplicable for typical welding of steel.

PTL 4 proposes a technique that prevents the low-temperature cracking by decreasing the amount of diffusible hydrogen and appropriately controlling strength and a chemical composition. However, this technique is also limitedly applicable for actual operation sites since a strength level to be satisfied varies depending on components.

Each of the previously proposed techniques described above aims to improve the resistance to low-temperature cracking. In actual welding operation, however, the amount of hydrogen in a weld metal may increase due to various factors. More essentially, therefore, the resistance to hydrogen embrittlement must be improved.

Furthermore, HT780 class steel is recently expansively applied to a weld metal used in an offshore structure. Such a weld metal is required to have excellent resistance to hydrogen embrittlement at the strength of 780 MPa class. Furthermore, the weld metal is preferably required to have excellent low-temperature toughness so as to be durable in a cold district.

CITATION LIST

Patent Literature

PTL 1: Japanese Unexamined Patent Application Publication No. 2005-40816.
PTL 2: Japanese Unexamined Patent Application Publication No. 2003-33876.
PTL 3: Japanese Unexamined Patent Application Publication No. 2002-115032.
PTL 4: Japanese Unexamined Patent Application Publication No. 11-147196.

SUMMARY OF INVENTION

Technical Problems

An object of the invention, which has been attained in light of the above-described circumstance, is to provide a weld metal that has excellent resistance to hydrogen embrittlement and is free from low-temperature cracking even at a high strength of more than 780 MPa, and preferably has excellent low-temperature toughness.

Means for Solving the Problems

The above-described issue has been solved by a weld metal having excellent resistance to hydrogen embrittlement according to the present invention. The weld metal is formed by gas shielded arc welding using a flux cored wire, and is summarized by containing: C: 0.02 to 0.12% (by mass percent (the same applies to the following for the chemical components)); Si: 0.10 to 2.00%; Mn: 0.90 to 2.5%; Ni: 0.20 to 3.5%; Ti: 0.040 to 0.15%; N: 0.015% or less (not including 0%); O: 0.030 to 0.10%; and the remainder consisting of iron and inevitable impurities, wherein retained austenite particles exist at a density of 2500 or more per square millimeter and in a volume fraction of 4.0% or more, and a β value represented by Formula (1) is 75 or more:

$$\beta \text{ value} = 320 \times [C] + 50 \times [Si] + 15 \times [Mn] + 10 \times [Ni] + 28 \times [Mo] \tag{1}$$

wherein [C], [Si], [Mn], [Ni], and [Mo] mean contents (mass percent) of C, Si, Mn, Ni, and Mo, respectively.

In measurement of the above-described number density, size of a retained austenite particle to be measured is equal to or larger than a measurement limit (0.15 μm or more in circle-equivalent diameter).

In a preferred embodiment of the invention, Mo is controlled to be less than 0.05%.

In a preferred embodiment of the invention, Si: 0.10 to 0.5% and Ni: 1.0 to 2.0% are satisfied, and an α value defined by Formula (2) is 3.2 or more. According to the above-described embodiment, a weld metal further having excellent low-temperature toughness (specifically, having an impact absorbed energy $vE_{-40}$ at −40° C. of more than 85 J) can be achieved.

$$\alpha\text{ value}=[Mn]+[Ni]+(2\times[Mo])+(16\times[Ti])-(12\times[O]) \quad (2)$$

wherein [Mn], [Ni], [Mo], [Ti], and [O] mean contents (mass percent) of Mn, Ni, Mo, Ti, and O, respectively.

In a preferred embodiment of the invention, the weld metal has oxide particles at a density of 5000 or more per square millimeter, each oxide particle containing 20 mass % or more Ti and having a circle-equivalent diameter of 0.15 to 1.0 μn. The above-described "circle-equivalent diameter" means a diameter of a circle that is assumed to have area equal to area of a retained austenite particle or an oxide particle that is recognizable and noticed in size on a viewing screen of a light microscope.

In a preferred embodiment of the invention, the weld metal further contains at least one selected from a group consisting of Cr: 2.0% or less (not including 0%), V: 0.60% or less (not including 0%), Nb: 0.15% or less (not including 0%), and Cu: 1.0% or less (not including 0%).

In a preferred embodiment of the invention, the weld metal further contains Al: 0.020% or less (not including 0%) and/or Zr: 0.10% or less (not including 0%).

In a preferred embodiment of the invention, the weld metal further contains B: 0.0050% or less (not including 0%).

Advantageous Effects of Invention

According to the invention, since the number density and the volume fraction of the retained austenite particles are appropriately controlled together with the chemical composition, a weld metal having excellent resistance to hydrogen embrittlement can be achieved even at a high strength of more than 780 MPa. Preferably, the content of each of Si and Ni is more strictly specified, and a predetermined relational expression defined by the content of each of Mn, Ni, Mo, Ti, and O is satisfied, thereby a weld metal further having excellent low-temperature toughness can be achieved.

BRIEF DESCRIPTION OF DRAWINGS

FIG. 1 is a schematic illustration showing a groove shape for preparation of a weld metal.

FIG. 2 is a schematic illustration showing a sampling position of a round-bar test specimen.

FIG. 3 is a graph illustrating a heat cycle (a relationship between time and temperature) simulating a reheat cycle.

FIG. 4 is a schematic illustration showing a shape of a test specimen for a tensile test.

DESCRIPTION OF EMBODIMENTS

Figure 5:
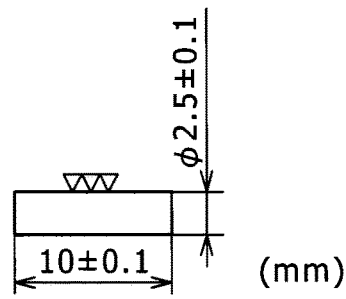
FIG. 5 is a schematic illustration showing a shape of a small test specimen for measurement of absorbed hydrogen content by SSRT.

The present invention is an improved technique of the weld metal having excellent resistance to hydrogen embrittlement according to Japanese Patent Application No. 2011-184117 previously disclosed by the applicant (hereinafter, referred to as the prior invention). Hereinafter, while the prior invention is described, details of achievement of the invention of the application and characterizing points thereof are described.

In the prior invention, while the retained austenite that acts as trap sites of diffusible hydrogen is noticed, dense distribution of the retained austenite particles is found to remarkably improve the resistance to hydrogen embrittlement, and the number density (2500 or more per square millimeter) and the volume fraction (4.0% or more) relative to the total microstructure of the retained austenite particles are specified. The resistance to hydrogen embrittlement is evaluated with an accelerated stress type SSTR, which gradually loads stress by dynamic strain, in such a manner that a small test specimen illustrated in FIG. 5 described later is used and embrittled by a small amount of diffusible hydrogen, and breaking elongation of the test specimen that has been forcibly broken is measured for the evaluation.

Furthermore, the prior invention defines the α value (defined by Formula (1) in the prior invention) represented by Mn, Ni, Mo, Ti, and O as an index for providing excellent low-temperature toughness. To improve the low-temperature toughness, it is necessary to decrease the amount of coarse grain-boundary ferrite grains formed from prior austenite grain boundaries. In the prior invention, a coefficient of each element is determined based on a large number of basic experiments, and the α value is determined to be 3.2 or more on the basis of the following findings: (1) each of Mn, Ni, Mo, Ti, and O, which define the α value, has a function of suppressing formation of grain-boundary ferrite grains when it exists in a solid-solved state, and (2) since part of Mn or Ti exists in a form of oxide, the amount of solid-solved Mn or Ti increases with a decrease in amount of O. In detail, it is disclosed that the α value must be controlled as described above, and the amount of each of Si and Ni, which is an element having a function of improving the low-temperature toughness, must be controlled to be within a more appropriate range in order to secure the desired low-temperature toughness.

After proposal of the prior invention, the inventors have further conducted various investigations. As a result, it has been found that SSRT using a large test specimen having a larger shape than the test specimen used in the prior invention is more appropriate for evaluation of the resistance to hydrogen embrittlement. In particular, in the case of a weld metal containing a large number of retained austenite particles at a predetermined density as in the prior invention, the retained austenite particles may not be uniformly dispersed due to a complicated thermal history during welding, and a region containing a smaller amount of retained austenite may be locally formed and may act as a crack origin. As a result, in the evaluation method of the prior invention, the resistance to hydrogen embrittlement is often varied depending on a sampling position of the small test specimen, and accurate evaluation suitable for an actual weld metal may not be conducted. Hence, the resistance to hydrogen embrittlement has been necessary to be evaluated using a larger test specimen in order to more accurately perform the evaluation.

Furthermore, the inventors have found that an increased amount of Mo in a weld metal lowers the resistance to hydrogen embrittlement in the case of a large test specimen. Mo is known as an element that increases strength of a weld metal. The weld metal of the prior invention also contains 0.05% or more Mo to secure high strength of more than 780 MPa. However, a subsequent study has revealed that a weld metal containing 0.05% or more Mo is evaluated to have excellent (acceptable) resistance to hydrogen embrittlement in a SSRT test using a small test specimen as in the prior invention, but is evaluated to be bad (unacceptable) in a SSRT test using a large test specimen (for example, see Nos. 40 and 49 in Table 3B in Example described later). In contrast, it has been found that a weld metal, in which Mo is decreased to less than 0.05% (including 0%), is allowed to have excellent resistance to hydrogen embrittlement in the case of using each of the small and large test specimens.

The reason why decreasing Mo in a weld metal increases breaking elongation in the SSRT test using a large test specimen and thus the resistance to hydrogen embrittlement is improved (conversely, the reason why increasing Mo lowers the resistance to hydrogen embrittlement) is estimated, but unclear in detail, as follows: if Mo, which is a ferrite stabilizing element, increases, the retained austenite becomes relatively unstable, leading to local formation of a region having a smaller amount of retained austenite, and breaking is originated from the region.

However, Mo is an element increasing strength of a weld metal. In the existing technique, therefore, if the amount of Mo in a weld metal is less than 0.05%, a desired high-strength level (TS>780 MPa) cannot be achieved. Hence, the invention newly defines the β value, which is defined by the strength increasing elements of C, Si, Mn, Ni, and Mo, as an index (a high-strength achievement parameter) for achieving the above-described high strength even if Mo is less than 0.05% in a weld metal. In this way, the inventors have found that a weld metal having the desired, excellent resistance to hydrogen embrittlement is achieved even at the high strength of more than 780 MPa through decreasing the amount of Mo in the weld metal and introduction of the β value, and have eventually accomplished the invention.

Consequently, the invention of the application is different from the prior invention in that (3) a large test specimen (see FIG. 6) compared with the prior invention is used as the SSRT test specimen in order to accurately evaluate the resistance to hydrogen embrittlement, (4) a different criterion for the resistance to hydrogen embrittlement is used, (5) the amount of Mo in a weld metal is decreased compared with the prior invention to achieve the desired resistance to hydrogen embrittlement, and (6) the β value is newly defined to achieve the high strength of more than 780 MPa in order to compensate the insufficient strength accompanying the decreased amount of Mo in the weld metal. The invention of the application is substantially the same as the prior invention except for the above-described points.

In this specification, "high strength" means a tensile strength TS of more than 780 MPa, preferably a tensile strength TS of roughly 800 to 980 MPa.

In this specification, "excellent resistance to hydrogen embrittlement" means a property that satisfies the requirements (7) and (8) below when the resistance to hydrogen embrittlement is evaluated according to a procedure as described later in Example.
(7) When a hydrogen embrittlement susceptibility index S (%) is determined according to Formula (5) described later using a small test specimen, S is less than 60%.
(8) In the case of using a large test specimen, breaking elongation is more than 2%.

In this specification, "excellent low-temperature toughness" as a preferred property means that when impact absorbed energy $vE_{-40}$ at −40° C. is measured according to a procedure as described later in Example, $vE_{-40}$ is larger than 85 J.

The requirements of the invention are now described.

As described above, the weld metal of the invention, which is formed by gas shielded arc welding using a flux cored wire, is characterized by containing: C: 0.02 to 0.12%; Si: 0.10 to 2.00%; Mn: 0.90 to 2.5%; Ni: 0.20 to 3.5%; Ti: 0.040 to 0.15%; N: 0.015% or less (not including 0%); O: 0.030 to 0.10%; and the remainder consisting of iron and inevitable impurities, wherein retained austenite particles exist at a density of 2500 or more per square millimeter and in a volume fraction of 4.0% or more, and a β value represented by Formula (1) is 75 or more.

$$\beta \text{ value} = 320 \times [C] + 50 \times [Si] + 15 \times [Mn] + 10 \times [Ni] + 28 \times [Mo] \qquad (1)$$

wherein [C], [Si], [Mn], [Ni], and [Mo] mean contents (mass percent) of C, Si, Mn, Ni, and Mo, respectively.

First, the retained austenite characterizing the weld metal of the invention is described.

As described above, in the invention, it is controlled that the retained austenite particles exist at a density of 2500 or more per square millimeter in the weld metal, and the volume fraction (a proportion relative to the total microstructure) of the retained austenite particles is 4.0% or more. According to the invention, since a predetermined amount of retained austenite particles are dispersed at an appropriate number density, a weld metal having excellent resistance to hydrogen embrittlement is provided.

The invention defines the above-described requirements particularly for the retained austenite that exists in an as welded zone of the weld metal. This is because since the retained austenite in the weld metal is decomposed due to a subsequent pass during welding, the amount of retained austenite easily varies depending on measurement points particularly in a reheated zone, while an as welded zone of a final pass is not affected by heat of a subsequent pass during welding, which makes it easy to accurately determine the amount of retained austenite.

It has been reported that the retained austenite is a microstructure that acts as a trap site of diffusible hydrogen and therefore has a function of decreasing diffusible hydrogen, i.e., contributes to improve the resistance to hydrogen embrittlement. In the past, however, the amount (a proportion relative to the total microstructure) of the retained austenite has been exclusively defined, while a dispersed state (number density) thereof has not been noticed. According to the investigation results of the inventors, it has been found that even if the amount of retained austenite is controlled, the desired resistance to hydrogen embrittlement is not obtained until the dispersed state thereof is appropriately controlled (for example, see Nos. 34, 45, 54, and 55 in Table 3B in Example described later).

Specifically, the following has been found to be effective for producing a weld metal having excellent resistance to hydrogen embrittlement: the amount of retained austenite to be a trap site of diffusible hydrogen is secured, and the number of retained austenite particles are dispersed densely (specifically at a density of 2500 or more per square millimeter), by which the effect of trapping diffusible hydrogen is maximally exhibited, and the resistance to hydrogen embrittlement is remarkably improved. For example, each of Nos. 34 and 45 in Table 3B in Example described later is an example where the volume fraction of retained austenite is nearly 7%, i.e., a predetermined amount of retained austenite exists, but the retained austenite particles are not dispersed at the predetermined number density (are not appropriately dispersed); hence, the resistance to hydrogen embrittlement is low in the case of using each of the small and large test specimens.

In light of improving the resistance to hydrogen embrittlement, a larger number density of the retained austenite particles is better. The number density is preferably 3000 or more per square millimeter, and more preferably 3300 or more per square millimeter. In light of improving the resistance to hydrogen embrittlement, the upper limit of the number density is not limited.

Furthermore, in light of improving the resistance to hydrogen embrittlement, a higher volume fraction of the retained austenite particles in the total microstructure is better. The volume fraction is preferably 4.5% or more, and more preferably 4.8% or more. Although the upper limit of the volume fraction is not limited in light of improving the resistance to hydrogen embrittlement, the upper limit is preferably roughly 10% or less in consideration that an excessively large amount of retained austenite particles lowers yield stress.

The invention is characterized in that the retained austenite is focused among microstructures constituting the weld metal and controlled in amount (the volume fraction) and in number density. Any of other microstructures typically contained in the weld metal may exist without limitation. Specifically, grain-boundary ferrite grains, martensite, and the like may be contained in addition to bainite as a main microstructure (at a volume fraction of about 50% relative to the total microstructure).

A chemical composition of the weld metal of the invention is now described.

[C: 0.02 to 0.12%]

C is an indispensable element for securing strength of the weld metal. The lower limit of the C content is 0.02% or more to allow such an effect to be exhibited. The lower limit is preferably 0.04% or more, and more preferably 0.06% or more. However, if the C content exceeds 0.12%, strength extremely increases and hydrogen embrittlement susceptibility becomes higher (i.e., the resistance to hydrogen embrittlement is worsened). Hence, the upper limit of the C content is 0.12%. The upper limit of the C content is preferably 0.10%, and more preferably 0.08% or less.

[Si: 0.10 to 2.00%]

Solid-solved Si has a function of slowing down formation of carbide particles and stabilizing the retained austenite. If the Si content is less than 0.10%, a predetermined amount of retained austenite cannot be secured, and the above-described function is not effectively exhibited. Hence, the lower limit of the Si content is 0.10% or more. The lower limit is preferably 0.25% or more, and more preferably 0.28% or more.

The upper limit of the Si content may vary depending on properties to be desired. In light of improving the resistance to hydrogen embrittlement as an essential issue to be solved, the upper limit of the Si content is 2.00% or less. This is because if the Si content is excessively high, the hydrogen embrittlement susceptibility becomes higher due to extremely increased strength. The upper limit is preferably 1.5% or less, and more preferably 0.5% or less. A decrease in Si content contributes to improvement in low-temperature toughness of the weld metal. Hence, if the low-temperature toughness is also desired to be improved in addition to the resistance to hydrogen embrittlement, the upper limit of the Si content is preferably 0.5% or less. This is because if the Si content exceeds 0.5%, hard martensite islands are formed and may act as failure origins, resulting in significant lowering of low-temperature toughness. More preferably, the upper limit is 0.4% or less.

[Mn: 0.90 to 2.5%]

Mn is an element necessary for securing strength of the weld metal. The lower limit of the Mn content is 0.90% or more to allow such an effect to be exhibited. The lower limit is preferably 1.2% or more, and more preferably 1.5% or more. However, if the Mn content exceeds 2.5%, strength extremely increases and the hydrogen embrittlement susceptibility becomes higher. Hence, the upper limit of the Mn content is 2.5%. The upper limit is preferably 2.2% or less, and more preferably 2.0% or less.

[Ni: 0.20 to 3.5%]

Ni is an element necessary for securing strength of the weld metal. The lower limit of the Ni content is 0.20% or more to allow such an effect to be exhibited. The lower limit is preferably 0.5% or more, and more preferably 1.0% or more. However, if the Ni content is excessive to exceed 3.5%, strength extremely increases and the hydrogen embrittlement susceptibility becomes higher. Hence, the upper limit of the Ni content is 3.5%. The upper limit is preferably 3.0% or less, and more preferably 2.8% or less.

Ni further has a function of improving low-temperature toughness of the weld metal. Hence, to achieve excellent low-temperature toughness together with the excellent resistance to hydrogen embrittlement, the Ni content is preferably controlled to be particularly 1.0 to 2.0% in the above-described range (0.20 to 3.5%). In detail, Ni allows the brittle-fracture-surface transition temperature to be lowered. Thus, Charpy impact absorption energy increases at low temperature, i.e., the low-temperature toughness is improved. The lower limit of the Ni content is preferably 1.0% or more to allow such a function of improving low-temperature toughness to be effectively exhibited. More preferably, the lower limit is 1.1% or more. However, if the Ni content exceeds 2.0%, martensite formation increases and thus strength increases, and the Charpy impact absorption energy is lowered. Hence, the upper limit of the Ni content is preferably 2.0% or less. More preferably, the upper limit is 1.8% or less.

[Ti: 0.040 to 0.15%]

Ti is an element that forms oxide as an origin of intragranular transformation, and contributes to dense dispersion of the retained austenite particles through refining a matrix microstructure. The lower limit of the Ti content is 0.040% or more to allow such an effect to be exhibited. The lower limit is preferably 0.050% or more, and more preferably 0.055% or more. However, if the Ti content exceeds 0.15%, strength extremely increases and thus hydrogen embrittlement susceptibility becomes higher. Hence, the upper limit of the Ti content is 0.15%. The upper limit is preferably 0.12% or less, and more preferably 0.08% or less.

[N: 0.015% or less (not including 0%)]

N is one of inevitably contaminated elements, and is industrially difficult to be decreased to 0%. N is effective for increasing strength of the weld metal. However, excessively high content of N extremely increases strength, resulting in higher hydrogen embrittlement susceptibility. Hence, the upper limit of the N content is 0.015% or less. The upper limit is preferably 0.010% or less, and more preferably 0.006% or less.

[O: 0.030 to 0.10%]

O is an element that forms oxide as an origin of intragranular transformation, and contributes to dense dispersion of the retained austenite particles through refining a microstructure. The lower limit of the O content is 0.030% or more to allow such an effect to be exhibited. The lower limit is preferably 0.035% or more, and more preferably 0.040% or more. However, if the O content exceeds 0.10%, Si oxides are formed, and thus solid-solved Si is decreased, so that the amount of retained austenite cannot be secured. Hence, the upper limit of the O content is 0.10%. The upper limit is preferably 0.080% or less, and more preferably 0.060% or less.

The weld metal of the invention contains the essential elements as described above while the remainder consists of iron and inevitable impurities. The inevitable impurities include elements (for example, P and S) incorporated depending on source materials, other materials, and situations of production facilities. Such impurities typically segregate in grain boundaries, which lowers grain-boundary strength and promotes low-temperature cracking. Hence, for example, P and S are preferably controlled to be 0.02% or less (not including 0%) and 0.025% or less (not including 0%), respectively.

Mo, which is an element characterizing the invention, may be contained as an inevitable impurity (in an amount of less than 0.01%), or may be actively contained at a level higher than the inevitable impurity level and in an amount of less than 0.05%. It has been confirmed that if the upper limit of Mo is less than 0.05%, the desired resistance to hydrogen embrittlement is effectively exhibited (see Example described later).

As described above, Mo is an element effective for increasing strength of the weld metal. However, studies after disclosure of the prior invention have revealed that if the Mo content exceeds 0.05%, breaking elongation in a SSRT test using a large test specimen does not satisfy the predetermined range, and the desired resistance to hydrogen embrittlement is not exhibited. Hence, the invention specifies the upper limit of the Mo content to be less than 0.05%. In light of improving the resistance to hydrogen embrittlement, a lower Mo content is better, and a preferable upper limit of the Mo content is 0.03%.

To compensate the lowered strength due to the decreased Mo content, the β value as a strength increasing parameter is newly introduced to secure the desired high strength. The β value is now described.

The β value, which is represented by Formula (1), is defined to secure the desired high strength of more than 780 MPa, and is specified to be 75 or more in the invention.

$$\beta \text{ value} = 320 \times [C] + 50 \times [Si] + 15 \times [Mn] + 10 \times [Ni] + 28 \times [Mo] \quad (1)$$

In Formula (1), [C], [Si], [Mn], [Ni], and [Mo] mean contents (mass percent) of C, Si, Mn, Ni, and Mo, respectively. As described above, Mo may be contained at an inevitable impurity level (in amount of less than 0.01%), or may be actively contained within a range of less than 0.05% at a level higher than the inevitable impurity level. Consequently, when Mo is contained at the impurity level, the β value is calculated assuming that [Mo] is 0, while when Mo is contained within the range of less than 0.05%, the β value is calculated assuming that [Mo] is equal to a value of such a contained amount.

As described above, the β value is defined by C, Si, Mn, Ni, and Mo as the strength increasing elements. The coefficient of each element is derived from many basic experiments in order to secure a desired high hardness in consideration of contribution on strength. As the β value increases, the strength is higher. The β value is preferably 80 or more, and more preferably 82 or more. While the upper limit of the β value can be determined based on the content of each element, the upper limit is preferably roughly 160 or less in consideration of an increase in hydrogen embrittlement susceptibility due to extremely increased strength.

While the weld metal of the invention has the essential components as described above, the weld metal may further contain other elements including (a) at least one selected from a group consisting of Cr: 2.0% or less (not including 0%), V: 0.60% or less (not including 0%), Nb: 0.15% or less (not including 0%), and Cu: 1.0% or less (not including 0%), (b) Al: 0.020% or less (not including 0%) and/or Zr: 0.10% or less (not including 0%), and (c) B: 0.0050% or less (not including 0%). The properties of the weld metal are further improved depending on the elements to be contained.

[At Least One Selected from Group Consisting of Cr: 2.0% or less (not including 0%), V: 0.60% or less (not including 0%), Nb: 0.15% or less (not including 0%), and Cu: 1.0% or less (not including 0%)]

Cr, V, Nb, and Cu are useful as the elements that increase strength of the weld metal. The elements may be contained singly or in a combination of at least two of them. To allow such an effect to be exhibited, the lower limit is preferably 0.05% or more for Cr, 0.02% or more for V, 0.01% or more for Nb, and 0.05% or more for Cu. However, an excessively large content of each element extremely increases strength, resulting in higher hydrogen embrittlement susceptibility. The upper limit of the content of each element is therefore preferably controlled as follows: 2.0% or less (more preferably 1.5% or less, and most preferably 1.0% or less) for Cr, 0.60% or less (more preferably 0.50% or less, and most preferably 0.40% or less) for V, 0.15% or less (more preferably 0.10% or less, and most preferably 0.08% or less) for Nb, and 1.0% or less (more preferably 0.5% or less, and most preferably 0.2% or less) for Cu.

[Al: 0.020% or less (not including 0%) and/or Zr: 0.10% or less (not including 0%)]

Each of Al and Zr is a strong deoxidizing element, and has a function of promoting increase in retained austenite through increase in solid-solved Si. Such elements may be contained singly or in a combined manner. To allow such an effect to be exhibited, the preferable lower limit is 0.010% or more for each of Al and Zr. However, an excessively large content of each element decreases intra-granular transformation originating from oxide, leading to higher hydrogen embrittlement susceptibility due to a coarsened microstructure. The upper limit of the content of each element is therefore preferably controlled as follows: 0.020% or less (more preferably 0.018% or less) for Al, and 0.10% or less (more preferably 0.06% or less) for Zr.

[B: 0.0050% or less (not including 0%)]

B is an element that contributes to increase in strength through suppressing formation of ferrite from prior austenite grain boundaries. To allow such an effect to be effectively exhibited, the lower limit of the B content is preferably 0.0010% or more. However, an excessively large content of B extremely increases strength, resulting in higher hydrogen embrittlement susceptibility. The upper limit of the B content is therefore preferably controlled to be 0.0050% or less (more preferably 0.0030% or less).

Furthermore, when the low-temperature toughness is also desired to be improved (specifically, to achieve impact absorbed energy $vE_{-40}$ at $-40°$ C.$>85$ J) in addition to the original issue of improving the resistance to hydrogen embrittlement, it is effective that Si and Ni are controlled to be 0.10 to 0.5% and 1.0 to 2.0%, respectively, and the α value defined by Formula (2) is adjusted to 3.2 or more, as described above.

$$\alpha \text{ value} = [Mn] + [Ni] + (2 \times [Mo]) + (16 \times [Ti]) - (12 \times [O]) \quad (2)$$

wherein [Mn], [Ni], [Mo], [Ti], and [O] mean contents (mass percent) of Mn, Ni, Mo, Ti, and O, respectively. In Formula (2), when Mo is at the impurity level, the α value is also calculated assuming that [Mo] is 0.

The α value is defined in the prior invention, and the detail thereof is as described before. As the α value increases, the low-temperature toughness becomes higher. The α value is preferably 3.4 or more, and more preferably 3.6 or more. While the upper limit of the α value can be determined based on the content of each element, the upper limit is preferably roughly 6.2 or less in consideration of an increase in hydrogen embrittlement susceptibility accompanying extremely increased strength due to enhanced hardenability.

Hereinbefore, the composition of the weld metal according to the invention and the β value and the α value relevant to the composition have been described.

To further improve the resistance to hydrogen embrittlement, oxide particles preferably exist at a density of 5000 or more per square millimeter, each oxide particle containing 20 mass % or more Ti and having a circle-equivalent diameter of 0.15 to 1.0 μm. As described above, Ti is an element that contributes to dense dispersion of the retained austenite particles through refining a matrix microstructure. The resistance to hydrogen embrittlement is further improved not only by controlling the amount of Ti in the weld metal, but also by controlling the number density of the Ti-containing oxide particles each having a predetermined size. If the amount of Ti in the oxide particle is less than 20 mass %, the above-described function of Ti is not effectively exhibited.

Here, "circle-equivalent diameter" means a diameter of a circle that is assumed to have area equal to area of a Ti-containing oxide particle, the size of which is noticed, observed in a viewing field of a light microscope (about X1000). Specifically, the circle-equivalent diameter of the Ti-containing oxide particle is determined according to a procedure as described later in the section of Example.

As the number density of the Ti-containing oxide particles is larger, the resistance to hydrogen embrittlement is improved. The number density is preferably 8000 or more per square millimeter, and more preferably 10000 or more per square millimeter. While the upper limit of the number density is not particularly limited with regard to the resistance to hydrogen embrittlement, the upper limit is preferably roughly 25000 or less per square millimeter in consideration of the low-temperature toughness.

To control the number density of the Ti-containing oxide particles to be within the above-described range, it is recommended that a ratio (Mn+Ti)/Si (that may be represented by a B value) is adjusted to more than 10.0 as defined by Formula (4) described later, as described in detail later.

A method of preparing the weld metal of the invention is now described.

The weld metal of the invention is based on being formed by gas shielded arc welding using a flux cored wire. Preferable conditions (in particular, a wire composition (welding material) and a welding condition) for producing the weld metal satisfying the above-described requirements are as follows.

The wire composition (welding material) preferably satisfies all of the following requirements (a) to (i) in mass percent relative to the total wire (100 mass %) including both a steel sheath and flux.

(a) Si (including all Si regardless of a form such as metal Si and Si oxide) contained in the welding material is 0.35 to 2.5%.

(b) Si in a form of metal Si in the welding material is 0.25% or more (the upper limit thereof is preferably 2.2% or less).

(c) $SiO_2$ in the welding material is 0.25% or less (the lower limit thereof is preferably 0.10% or more).

(d) Ti (including all Ti regardless of a form such as metal Ti and Ti oxide) contained in the welding material is 2.5 to 4.5%.

(e) Al (including all Al regardless of a form such as metal Al and Al oxide) contained in the welding material is 0.10% or more (the upper limit thereof is preferably 0.70% or less).

(f) Zr (including all Zr regardless of a form such as metal Zr and Zr oxide) contained in the welding material is 0.035% or more (the upper limit thereof is preferably 0.10% or less).

(g) Mg (including all Mg regardless of a form such as metal Mg and Mg oxide) contained in the welding material is 0.4% or more (the upper limit thereof is preferably 0.70% or less).

(h) An A value is 0.30 or more, the A value being obtained according to the following Formula from the amounts of Si ((a)), Ti ((d)), Al ((e)), Zr ((f)), and Mg ((g)) in the welding material, (the upper limit of the A value is preferably 1.80 or less).

A value=Si—[Si/(Ti+2×Al+2×Zr+3.5×Mg)]

(i) A ratio (B value), which is represented by (Mn+Ti)/Si, on Si ((a)), Ti ((d)), and Mn (including all Mn regardless of its form contained in the welding material), satisfies a relationship of Formula (3).

(Mn+Ti)/Si(=B value)>4.0    (3)

The reason for limiting each of the above-described (a) to (i) is now described.

Each of (a) to (h) is defined to secure an effective amount of solid-solved Si for providing the predetermined amount of the retained austenite particles and the predetermined number density of the retained austenite particles.

First, the requirements (a) to (c) as definitions on Si are described. In each of the case where Si in a form of metal Si is lower than 0.25% as described in (b), the case where $SiO_2$ exceeds 0.25% as described in (c), and the case where the amount of all Si in the welding material is lower than 0.35% as described in (a), i.e., in the case where the requirements (a) to (c) are not satisfied, an amount of solid-solved Si necessary for securing the amount of retained austenite cannot be secured. As a result, the desired amount (volume fraction) of retained austenite is not obtained, and the resistance to hydrogen embrittlement is lowered.

In light of securing the amount of solid-solved Si, the amount of Si (the total amount of Si) defined by (a) is better as it is larger. However, if the total amount of Si exceeds the upper limit value (2.5%), the amount of Si in the weld metal exceeds the upper limit value (2.00%) defined in the invention, and strength extremely increases, resulting in higher hydrogen embrittlement susceptibility. Hence, the preferable upper limit of the amount of Si in the welding material is 2.5% or less.

The requirements (d) to (g) are now described. Such requirements make definitions on Ti (the requirement (d)), Al (the requirement (e)), Zr (the requirement (f)), and Mg (the requirement (g)) that are oxidizing elements stronger than Si. If each element does not satisfy the scope of the requirement, Si in a form of Si oxide (for example, $SiO_2$, Si—Mn-based composite oxide, and the like) increases and solid-solved Si accordingly decreases in the weld metal. As a result, the number density and the volume fraction of the retained austenite particles are lowered, and the resistance to hydrogen embrittlement is also lowered.

In light of securing the amount of solid-solved Si, the amount of Ti (the total amount of Ti) defined by (d) is better as it is larger. However, if the total amount of Ti exceeds the upper limit value (4.5%), the amount of Ti in the weld metal exceeds the upper limit value (0.15%) defined in the invention. Hence, the preferable upper limit of the amount of Ti in the welding material is 4.5% or less.

Similarly, the preferable upper limit of the Al amount in the welding material is 0.70% or less. The preferable upper limit of the amount of Zr in the welding material is 0.10% or less. The preferable upper limit of the amount of Mg in the welding material is 0.70% or less.

The A value defined by the requirement (h) is calculated based on the content of each of Si, Ti, Al, Zr, and Mg, which greatly relates to fluctuations of the amount of solid-solved Si. If the A value is lower than the range (0.30 or more), Si in a form of Si oxide increases and solid-solved Si accordingly decreases in the weld metal, resulting in lowering of the resistance to hydrogen embrittlement.

The requirement (i) is now described. The requirement (i) represented by the ratio (B value), (Mn+Ti)/Si, is defined to secure the number density of the retained austenite particles in the weld metal. As described above, the weld metal of the invention contains bainite as a main microstructure and a predetermined amount of retained austenite. Since the retained austenite is formed between bainite laths, the bainite microstructure as a matrix must be refined in order to increase the number density of the retained austenite particles. The investigation results of the inventors have revealed that when the B value satisfies the relationship of Formula (3), i.e., the ratio (Mn+Ti)/Si>4.0, Ti-containing oxide (in detail, oxide containing at least Ti and Mn) is formed, and the bainite microstructure is refined through intra-granular transformation originating from the oxide.

The investigation results of the inventors have further revealed that when the ratio (B value), (Mn+Ti)/Si, satisfies a relationship of Formula (4), the Ti-containing oxide particles are densely dispersed in the weld metal, and the bainite microstructure is further refined. Specifically, the number density of the Ti-containing oxide particles, each of which contains 20 mass % or more Ti and has a circle-equivalent diameter of 0.15 to 1.0 µm, becomes 5000 or more per square millimeter, and further excellent resistance to hydrogen embrittlement is exhibited.

$$(Mn+Ti)/Si(=B\ value) > 10.0 \quad (4)$$

In this way, the increased ratio (Mn+Ti)/Si represented by the B value sequentially provides refinement of the bainite microstructure, increase in number density of the Ti—Mn-based oxide, and increase in number density of the retained austenite particles, and eventually contributes to improvement in resistance to hydrogen embrittlement.

Although other components (for example, C, Mn, and Ni as the essential components of the weld metal, and Mo, Cr, V, Nb, Cu, and B as the optional components thereof) in the welding material are not limited in amount as long as the amount of each of the components of the weld metal is appropriately controlled so as to be within the predetermined range, the components are recommended to be roughly controlled in amount as follows.

The components of the welding material are preferably controlled to be 0.05 to 0.13% for C, 1.6 to 3.4% for Mn, 0.35 to 3.2% for Ni, 0 to 0.05% for Mo, 0 to 1.7% for Cr, 0 to 0.6% for V, 0 to 0.12% for Nb, 0 to 0.75% for Cu, and 0 to 0.005% for B.

A condition of the gas shielded arc welding for forming the weld metal is preferably controlled as follows.

Heat input is preferably 2.5 kJ/mm or less. If the heat input exceeds 2.5 kJ/mm, cooling rate during welding is lowered, and decomposition of the retained austenite is promoted. As a result, the predetermined (number density and volume fraction of) retained austenite particles are not provided. A smaller heat input is better. For example, the heat input is preferably 2.0 kJ/mm or less. The lower limit of the heat input is preferably roughly 0.7 kJ/mm or more in consideration of operation efficiency during welding.

The shield gas to be used preferably has a composition of a mixed gas of, for example, $CO_2$ and an inert gas such as Ar rather than a composition of a single gas consisting of an inert gas such as Ar. This is because the number density of the Ti-containing oxide particles increases and refinement of the bainite microstructure useful for increasing the number density of the retained austenite particles are promoted depending on the composition of the shield gas. Examples of a typical mixed gas used in the invention include a mixed gas (including 20 vol % $CO_2$ and Ar as the remainder) as described later in Example.

In the invention, the flux cored wire is used for welding. The filling rate of flux in the wire is not limited as long as it is usable for gas shield arc welding, and is generally about 10 to 20%.

EXAMPLE

Although the invention is now described in detail with Example, the invention is not intended to be limited thereto, and modifications or alterations thereof may be made within the scope without departing from the gist described before and later, all of which are included in the technical scope of the invention.

Example 1

Flux cored wires (welding materials each having a wire diameter of 1.2 mm and a flux filling rate of 13.5%) having chemical compositions (mass percent) listed in Tables 1A and 1B were used to prepare weld metals in the following procedure, and various properties (tensile strength, hydrogen embrittlement susceptibility, and low-temperature toughness) were evaluated. In columns of Tables 1A and 1B, "–" means "not added" ("not contained"). In addition, "remainder" means residual components (iron and inevitable impurities) other than elements listed in each Table.

TABLE 1A

| Welding material No. | C | Si | Mn | Ni | Ti | N | O | Mo | Cr | V | Nb | Cu |
|---|---|---|---|---|---|---|---|---|---|---|---|---|
| F1 | 0.10 | 0.80 | 2.6 | 1.20 | 3.26 | 0.002 | 2.40 | — | — | — | — | — |
| F2 | 0.10 | 0.55 | 2.8 | 0.95 | 3.26 | 0.002 | 2.40 | — | — | — | — | — |
| F3 | 0.11 | 0.41 | 2.2 | 2.20 | 3.26 | 0.002 | 2.40 | — | 0.71 | — | — | — |

TABLE 1A-continued

| Welding material No. | C | Si | Mn | Ni | Ti | N | O | Mo | Cr | V | Nb | Cu |
|---|---|---|---|---|---|---|---|---|---|---|---|---|
| F4 | 0.10 | 0.95 | 2.7 | 1.00 | 3.26 | 0.002 | 2.40 | 0.05 | 0.65 | — | — | — |
| F5 | 0.10 | 1.70 | 2.8 | 1.26 | 4.21 | 0.002 | 2.40 | 0.04 | — | — | — | — |
| F6 | 0.11 | 0.55 | 2.0 | 1.24 | 3.26 | 0.002 | 2.40 | — | 1.00 | — | — | — |
| F7 | 0.10 | 0.41 | 2.3 | 1.77 | 3.26 | 0.002 | 2.40 | — | — | — | — | — |
| F8 | 0.10 | 0.41 | 2.6 | 2.00 | 3.26 | 0.002 | 2.40 | 0.03 | — | — | — | — |
| F9 | 0.10 | 0.41 | 2.3 | 1.78 | 3.26 | 0.002 | 2.40 | — | 0.80 | — | — | — |
| F10 | 0.10 | 0.41 | 2.0 | 1.83 | 3.26 | 0.002 | 2.40 | 0.03 | 0.83 | — | — | — |
| F11 | 0.10 | 0.41 | 2.2 | 1.84 | 3.26 | 0.002 | 2.05 | 0.02 | 1.05 | — | — | — |
| F12 | 0.10 | 0.52 | 2.3 | 2.31 | 3.26 | 0.002 | 2.40 | — | — | — | — | 0.49 |
| F13 | 0.05 | 0.55 | 2.7 | 2.02 | 3.26 | 0.002 | 2.40 | 0.02 | — | — | — | — |
| F14 | 0.15 | 0.41 | 2.1 | 1.97 | 3.26 | 0.002 | 2.40 | — | 1.00 | — | — | — |
| F15 | 0.07 | 1.85 | 3.4 | 1.56 | 4.21 | 0.002 | 2.40 | — | 0.53 | — | — | 0.13 |
| F16 | 0.10 | 0.37 | 1.6 | 2.98 | 3.65 | 0.002 | 2.40 | — | — | 0.45 | — | — |
| F17 | 0.11 | 0.37 | 2.2 | 1.42 | 3.65 | 0.002 | 2.40 | 0.02 | 1.10 | — | 0.10 | — |
| F18 | 0.07 | 0.90 | 2.2 | 0.36 | 3.65 | 0.002 | 2.40 | 0.02 | 0.78 | — | — | — |
| F19 | 0.11 | 0.41 | 2.6 | 3.38 | 3.26 | 0.002 | 2.40 | — | 0.35 | 0.20 | — | — |
| F20 | 0.06 | 0.41 | 2.6 | 1.69 | 2.70 | 0.002 | 2.40 | — | 0.73 | 0.25 | — | — |
| F21 | 0.11 | 0.41 | 2.0 | 2.51 | 3.26 | 0.002 | 2.40 | 0.03 | 0.70 | — | — | — |
| F22 | 0.10 | 0.48 | 2.5 | 1.56 | 3.26 | 0.002 | 2.40 | — | — | — | — | — |
| F23 | 0.10 | 0.37 | 2.0 | 1.74 | 3.65 | 0.002 | 2.05 | — | 0.90 | — | — | — |
| F24 | 0.08 | 0.55 | 2.4 | 1.53 | 3.26 | 0.002 | 2.40 | — | 1.65 | — | — | — |
| F25 | 0.10 | 0.48 | 2.6 | 1.18 | 3.26 | 0.002 | 2.40 | — | — | — | 0.04 | — |
| F26 | 0.11 | 0.39 | 2.3 | 1.66 | 3.26 | 0.002 | 2.40 | 0.04 | 1.00 | 0.14 | — | — |
| F27 | 0.11 | 0.38 | 2.0 | 1.90 | 3.26 | 0.002 | 2.40 | — | — | 0.60 | — | — |
| F28 | 0.11 | 0.38 | 1.9 | 1.74 | 3.26 | 0.002 | 2.40 | 0.02 | 1.31 | — | 0.15 | — |
| F29 | 0.08 | 0.55 | 2.6 | 1.63 | 3.26 | 0.002 | 2.40 | — | — | — | — | 0.75 |
| F30 | 0.10 | 0.52 | 2.2 | 1.63 | 3.26 | 0.002 | 2.40 | — | — | — | — | — |
| F31 | 0.10 | 0.41 | 2.3 | 1.90 | 3.26 | 0.002 | 2.40 | — | — | — | — | — |

| Welding material No. | Al | Zr | Mg | B | Remainder | A value | (Ti + Mn)/Si (B value) | Metal Si | SiO$_2$ |
|---|---|---|---|---|---|---|---|---|---|
| F1 | 0.13 | 0.040 | 0.47 | — | 89 | 0.65 | 7.3 | 0.70 | 0.17 |
| F2 | 0.13 | 0.040 | 0.47 | — | 89 | 0.45 | 11.0 | 0.41 | 0.17 |
| F3 | 0.13 | 0.040 | 0.47 | — | 88 | 0.33 | 13.3 | 0.31 | 0.17 |
| F4 | 0.14 | 0.040 | 0.47 | — | 88 | 0.77 | 6.3 | 0.82 | 0.17 |
| F5 | 0.13 | 0.040 | 0.47 | — | 87 | 1.43 | 4.1 | 1.57 | 0.17 |
| F6 | 0.13 | 0.040 | 0.47 | — | 89 | 0.45 | 9.6 | 0.41 | 0.17 |
| F7 | 0.13 | 0.040 | 0.47 | — | 89 | 0.33 | 13.6 | 0.31 | 0.17 |
| F8 | 0.13 | 0.040 | 0.47 | — | 89 | 0.33 | 14.3 | 0.31 | 0.17 |
| F9 | 0.32 | 0.040 | 0.47 | — | 88 | 0.34 | 13.6 | 0.31 | 0.17 |
| F10 | 0.14 | 0.040 | 0.47 | — | 88 | 0.33 | 12.8 | 0.31 | 0.17 |
| F11 | 0.13 | 0.040 | 0.47 | — | 88 | 0.33 | 13.3 | 0.31 | 0.17 |
| F12 | 0.13 | 0.040 | 0.47 | — | 88 | 0.42 | 10.7 | 0.41 | 0.17 |
| F13 | 0.45 | 0.040 | 0.47 | — | 88 | 0.46 | 10.8 | 0.41 | 0.17 |
| F14 | 0.13 | 0.040 | 0.47 | — | 88 | 0.33 | 13.1 | 0.31 | 0.17 |
| F15 | 0.13 | 0.040 | 0.47 | — | 85 | 1.55 | 4.1 | 1.72 | 0.17 |
| F16 | 0.13 | 0.250 | 0.47 | — | 88 | 0.31 | 14.2 | 0.25 | 0.17 |
| F17 | 0.13 | 0.040 | 0.47 | — | 88 | 0.30 | 15.8 | 0.25 | 0.17 |
| F18 | 0.14 | 0.040 | 0.47 | — | 89 | 0.74 | 6.5 | 0.75 | 0.23 |
| F19 | 0.13 | 0.040 | 0.47 | — | 87 | 0.33 | 14.3 | 0.31 | 0.17 |
| F20 | 0.13 | 0.040 | 0.47 | — | 89 | 0.32 | 12.9 | 0.31 | 0.17 |
| F21 | 0.13 | 0.040 | 0.47 | 0.004 | 88 | 0.33 | 12.8 | 0.31 | 0.17 |
| F22 | 0.13 | 0.200 | 0.47 | — | 89 | 0.39 | 12.0 | 0.38 | 0.17 |
| F23 | 0.14 | 0.040 | 0.47 | — | 89 | 0.30 | 15.3 | 0.33 | 0.05 |
| F24 | 0.13 | 0.040 | 0.47 | — | 87 | 0.45 | 10.3 | 0.41 | 0.17 |
| F25 | 0.14 | 0.040 | 0.47 | — | 89 | 0.39 | 12.2 | 0.38 | 0.17 |
| F26 | 0.13 | 0.040 | 0.47 | — | 88 | 0.32 | 14.3 | 0.28 | 0.17 |
| F27 | 0.13 | 0.040 | 0.47 | — | 89 | 0.31 | 13.8 | 0.28 | 0.17 |
| F28 | 0.13 | 0.040 | 0.47 | — | 88 | 0.31 | 13.6 | 0.28 | 0.17 |
| F29 | 0.14 | 0.040 | 0.47 | — | 88 | 0.45 | 10.7 | 0.41 | 0.17 |
| F30 | 0.13 | 0.040 | 0.47 | 0.006 | 89 | 0.42 | 10.5 | 0.38 | 0.17 |
| F31 | 0.32 | 0.040 | 0.47 | — | 89 | 0.34 | 13.6 | 0.31 | 0.17 |

TABLE 1B

| Welding material No. | C | Si | Mn | Ni | Ti | N | O | Mo | Cr | V | Nb | Cu |
|---|---|---|---|---|---|---|---|---|---|---|---|---|
| F32 | 0.10 | 0.33 | 1.9 | 1.08 | 3.26 | 0.002 | 2.40 | — | — | — | — | — |
| F33 | 0.11 | 2.53 | 2.3 | 1.28 | 3.26 | 0.002 | 2.40 | — | — | — | — | — |
| F34 | 0.08 | 0.52 | 2.6 | 1.97 | 2.48 | 0.002 | 2.40 | — | 0.52 | — | — | — |
| F35 | 0.09 | 0.52 | 2.6 | 2.11 | 4.62 | 0.002 | 2.40 | — | — | — | — | — |
| F36 | 0.10 | 0.55 | 2.2 | 1.36 | 3.26 | 0.002 | 2.40 | — | — | — | — | — |
| F37 | 0.10 | 0.52 | 2.2 | 1.67 | 3.26 | 0.002 | 2.40 | 0.03 | 1.25 | — | — | — |

TABLE 1B-continued

| | | | | | | | | | | | |
|---|---|---|---|---|---|---|---|---|---|---|---|
| F38 | 0.11 | 0.72 | 2.3 | 0.20 | 3.26 | 0.002 | 2.40 | — | — | — | — | — |
| F39 | 0.11 | 0.38 | 2.8 | 1.80 | 4.42 | 0.002 | 2.40 | 0.10 | 0.72 | — | — | — |
| F40 | 0.03 | 0.38 | 2.3 | 3.02 | 3.26 | 0.002 | 2.40 | 0.02 | — | — | — | — |
| F41 | 0.09 | 0.52 | 2.2 | 1.30 | 3.26 | 0.002 | 2.40 | — | — | — | — | 0.15 |
| F42 | 0.10 | 0.36 | 1.2 | 1.93 | 3.26 | 0.002 | 2.40 | — | — | — | — | — |
| F43 | 0.18 | 0.15 | 2.6 | 1.76 | 3.26 | 0.002 | 2.40 | — | — | — | — | — |
| F44 | 0.10 | 2.45 | 2.1 | 1.71 | 3.26 | 0.002 | 2.40 | 0.05 | 0.90 | — | — | — |
| F45 | 0.10 | 0.52 | 3.4 | 1.65 | 3.26 | 0.002 | 2.40 | — | — | — | — | — |
| F46 | 0.10 | 0.55 | 2.3 | 3.66 | 3.26 | 0.002 | 2.40 | — | — | — | — | — |
| F47 | 0.11 | 0.52 | 2.3 | 0.93 | 3.26 | 0.002 | 2.40 | — | 0.38 | — | — | — |
| F48 | 0.10 | 0.52 | 2.2 | 1.37 | 3.26 | 0.002 | 2.40 | 0.06 | — | — | — | — |
| F49 | 0.09 | 0.41 | 2.3 | 1.96 | 3.26 | 0.002 | 2.40 | — | 2.10 | — | — | — |
| F50 | 0.10 | 0.41 | 2.2 | 1.50 | 3.26 | 0.002 | 2.40 | — | — | 0.66 | — | — |
| F51 | 0.10 | 0.52 | 2.6 | 1.42 | 3.26 | 0.002 | 2.40 | — | 0.50 | — | 0.19 | — |
| F52 | 0.10 | 0.52 | 2.8 | 1.28 | 3.26 | 0.002 | 2.40 | 0.07 | — | — | — | 1.22 |
| F53 | 0.10 | 0.52 | 1.9 | 1.68 | 3.26 | 0.002 | 2.40 | — | — | — | — | — |
| F54 | 0.11 | 0.83 | 2.2 | 2.21 | 3.26 | 0.002 | 2.40 | — | — | — | — | — |
| F55 | 0.11 | 0.41 | 2.2 | 1.32 | 3.26 | 0.002 | 2.40 | — | — | — | — | — |

| Welding material No. | Al | Zr | Mg | B | Remainder | A value | (Ti + Mn)/ Si (B value) | Metal Si | $SiO_2$ |
|---|---|---|---|---|---|---|---|---|---|
| F32 | 0.13 | 0.040 | 0.47 | — | 90 | 0.27 | 15.6 | 0.23 | 0.17 |
| F33 | 0.13 | 0.040 | 0.47 | — | 87 | 2.05 | 2.2 | 2.41 | 0.17 |
| F34 | 0.13 | 0.040 | 0.47 | — | 89 | 0.40 | 9.8 | 0.38 | 0.17 |
| F35 | 0.13 | 0.040 | 0.47 | — | 87 | 0.44 | 13.9 | 0.38 | 0.17 |
| F36 | 0.09 | 0.040 | 0.47 | — | 90 | 0.44 | 9.9 | 0.41 | 0.17 |
| F37 | 0.13 | 0.031 | 0.47 | — | 88 | 0.42 | 10.5 | 0.38 | 0.17 |
| F38 | 0.13 | 0.040 | 0.37 | — | 90 | 0.57 | 7.7 | 0.60 | 0.17 |
| F39 | 0.13 | 0.040 | 0.74 | — | 86 | 0.33 | 19.0 | 0.28 | 0.17 |
| F40 | 0.13 | 0.040 | 0.47 | — | 88 | 0.31 | 14.6 | 0.24 | 0.23 |
| F41 | 0.13 | 0.040 | 0.47 | — | 89 | 0.42 | 10.5 | 0.38 | 0.27 |
| F42 | 0.13 | 0.040 | 0.47 | — | 90 | 0.29 | 12.4 | 0.27 | 0.15 |
| F43 | 0.13 | 0.040 | 0.47 | — | 89 | 0.12 | 39.1 | 0.11 | 0.05 |
| F44 | 0.13 | 0.040 | 0.47 | — | 86 | 1.98 | 2.2 | 2.31 | 0.23 |
| F45 | 0.13 | 0.040 | 0.47 | — | 88 | 0.42 | 12.8 | 0.38 | 0.17 |
| F46 | 0.12 | 0.040 | 0.47 | — | 87 | 0.44 | 10.1 | 0.41 | 0.17 |
| F47 | 0.13 | 0.040 | 0.47 | — | 89 | 0.42 | 10.7 | 0.38 | 0.17 |
| F48 | 0.13 | 0.040 | 0.47 | — | 89 | 0.42 | 10.5 | 0.38 | 0.17 |
| F49 | 0.13 | 0.040 | 0.47 | — | 87 | 0.33 | 13.6 | 0.31 | 0.17 |
| F50 | 0.14 | 0.040 | 0.47 | — | 89 | 0.33 | 13.3 | 0.31 | 0.17 |
| F51 | 0.13 | 0.040 | 0.47 | — | 88 | 0.42 | 11.3 | 0.38 | 0.17 |
| F52 | 0.13 | 0.040 | 0.47 | — | 88 | 0.42 | 11.7 | 0.38 | 0.17 |
| F53 | 0.80 | 0.040 | 0.47 | — | 89 | 0.44 | 9.9 | 0.38 | 0.17 |
| F54 | 0.14 | 0.315 | 0.47 | — | 88 | 0.69 | 6.6 | 0.70 | 0.17 |
| F55 | 0.13 | 0.040 | 0.47 | 0.006 | 90 | 0.33 | 13.3 | 0.31 | 0.17 |

[Preparation of Weld Metal]

An SM490A steel plate (20 mm in thickness) having a groove shape as illustrated in FIG. 1 was prepared as a base metal steel plate. Gas shielded arc welding was then carried out under the following condition using the welding materials listed in Tables 1A and 1B.

(Welding Condition)
Shield gas: 20 vol % $CO_2$-80 vol % Ar mixed gas.
Current, voltage, and welding speed: 270 to 280 A, 29 V, and 3.0 to 8.0 mm/sec.
Heat Input Condition:
(I) 1.0 kJ/mm (280 A, 29 V, and 8.0 mm/sec).
(II) 1.74 kJ/mm (270 A, 29 V, and 4.5 mm/sec).
(III) 2.37 kJ/mm (270 A, 29 V, and 3.3 mm/sec).
(IV) 2.61 kJ/mm (270 A, 29 V, and 3.0 mm/sec).

Preheating/interpass temperature: 105 to 150° C.
Lamination: 3 layers/13 passes.

A round-bar test specimen 5 mm in diameter was taken from a final pass of each prepared weld metal (FIG. 2 illustrates a sampling position: corresponding to an as welded zone), and was then subjected to a heat cycle simulating a reheat cycle. FIG. 3 illustrates such a heat cycle (a relationship between time and temperature) simulating the reheat cycle. Tables 2A and 2B show chemical compositions (mass percent, the remainder consisting of iron and inevitable impurities other than the elements listed in each Table) of the prepared weld metals. In a column of each element, "<" means an inevitable impurity amount (lower than the impurity level). Each Table collectively shows a type of the welding material (see Tables 1A and 1B) and a type of the above-described heat input condition used for preparation of each weld metal.

TABLE 2A

| Experiment No. | Heat input condition | Welding material No. | C | Si | Mn | Ni | Ti | N | O | Mo |
|---|---|---|---|---|---|---|---|---|---|---|
| 1 | II | F1 | 0.08 | 0.61 | 1.95 | 1.15 | 0.052 | 0.0038 | 0.043 | <0.01 |
| 2 | II | F2 | 0.08 | 0.45 | 2.15 | 0.89 | 0.066 | 0.0047 | 0.042 | <0.01 |
| 3 | II | F3 | 0.08 | 0.33 | 1.56 | 2.13 | 0.051 | 0.0042 | 0.048 | <0.01 |
| 4 | I | F4 | 0.07 | 0.82 | 2.07 | 0.96 | 0.055 | 0.0043 | 0.045 | 0.04 |

TABLE 2A-continued

| Experiment No. | Heat input condition | Welding material No. | C | Si | Mn | Ni | Ti | N | O | Mo |
|---|---|---|---|---|---|---|---|---|---|---|
| 5 | III | F5 | 0.08 | 1.11 | 2.11 | 1.23 | 0.129 | 0.0048 | 0.048 | 0.03 |
| 6 | II | F6 | 0.09 | 0.45 | 1.38 | 1.20 | 0.066 | 0.0045 | 0.048 | <0.01 |
| 7 | II | F7 | 0.08 | 0.28 | 1.65 | 1.73 | 0.066 | 0.0051 | 0.051 | <0.01 |
| 8 | I | F8 | 0.07 | 0.31 | 1.78 | 1.92 | 0.061 | 0.0048 | 0.053 | 0.02 |
| 9 | III | F9 | 0.08 | 0.30 | 1.66 | 1.73 | 0.065 | 0.0051 | 0.050 | <0.01 |
| 10 | II | F10 | 0.08 | 0.30 | 1.46 | 1.80 | 0.064 | 0.0050 | 0.054 | 0.03 |
| 11 | II | F11 | 0.08 | 0.30 | 1.50 | 1.81 | 0.066 | 0.0050 | 0.049 | 0.01 |
| 12 | I | F12 | 0.08 | 0.38 | 1.65 | 2.22 | 0.070 | 0.0047 | 0.048 | <0.01 |
| 13 | I | F13 | 0.02 | 0.48 | 2.09 | 1.97 | 0.053 | 0.0042 | 0.033 | 0.02 |
| 14 | I | F14 | 0.11 | 0.28 | 1.25 | 1.93 | 0.058 | 0.0047 | 0.038 | <0.01 |
| 15 | II | F15 | 0.05 | 1.55 | 2.41 | 1.54 | 0.118 | 0.0046 | 0.051 | <0.01 |
| 16 | II | F16 | 0.07 | 0.25 | 0.92 | 2.81 | 0.112 | 0.0046 | 0.076 | <0.01 |
| 17 | I | F17 | 0.09 | 0.26 | 1.66 | 1.38 | 0.058 | 0.0055 | 0.046 | 0.01 |
| 18 | II | F18 | 0.05 | 0.76 | 1.58 | 0.33 | 0.096 | 0.0083 | 0.041 | 0.02 |
| 19 | I | F19 | 0.08 | 0.31 | 1.87 | 3.21 | 0.065 | 0.0065 | 0.062 | <0.01 |
| 20 | II | F20 | 0.04 | 0.33 | 2.00 | 1.62 | 0.043 | 0.0092 | 0.048 | <0.01 |
| 21 | III | F21 | 0.10 | 0.28 | 1.49 | 2.45 | 0.063 | 0.0055 | 0.056 | 0.03 |
| 22 | II | F22 | 0.07 | 0.35 | 1.70 | 1.53 | 0.062 | 0.0113 | 0.072 | <0.01 |
| 23 | II | F23 | 0.08 | 0.27 | 1.37 | 1.70 | 0.065 | 0.0048 | 0.089 | <0.01 |
| 24 | II | F24 | 0.05 | 0.44 | 1.70 | 1.49 | 0.081 | 0.0047 | 0.043 | <0.01 |
| 25 | I | F25 | 0.07 | 0.35 | 1.75 | 1.15 | 0.078 | 0.0039 | 0.050 | <0.01 |
| 26 | II | F26 | 0.09 | 0.19 | 1.68 | 1.63 | 0.079 | 0.0052 | 0.069 | 0.04 |
| 27 | III | F27 | 0.09 | 0.12 | 1.46 | 1.86 | 0.074 | 0.0050 | 0.050 | <0.01 |
| 28 | II | F28 | 0.10 | 0.27 | 1.35 | 1.72 | 0.060 | 0.0046 | 0.053 | 0.01 |
| 29 | III | F29 | 0.05 | 0.46 | 1.92 | 1.59 | 0.063 | 0.0049 | 0.046 | <0.01 |
| 30 | II | F30 | 0.08 | 0.40 | 1.55 | 1.60 | 0.057 | 0.0048 | 0.052 | <0.01 |
| 31 | II | F31 | 0.07 | 0.31 | 1.61 | 1.82 | 0.061 | 0.0048 | 0.052 | <0.01 |

| Experiment No. | Cr | V | Nb | Cu | Al | Zr | B | β value | α value |
|---|---|---|---|---|---|---|---|---|---|
| 1 | <0.01 | <0.01 | <0.01 | <0.01 | <0.01 | <0.01 | <0.0008 | 97 | 3.4 |
| 2 | <0.01 | <0.01 | <0.01 | <0.01 | <0.01 | <0.01 | <0.0008 | 89 | 3.6 |
| 3 | 0.70 | <0.01 | <0.01 | <0.01 | <0.01 | <0.01 | <0.0008 | 87 | 3.9 |
| 4 | 0.65 | <0.01 | <0.01 | <0.01 | <0.01 | <0.01 | <0.0008 | 105 | 3.5 |
| 5 | <0.01 | <0.01 | <0.01 | <0.01 | <0.01 | <0.01 | <0.0008 | 126 | 4.9 |
| 6 | 0.98 | <0.01 | <0.01 | <0.01 | <0.01 | <0.01 | <0.0008 | 84 | 3.1 |
| 7 | <0.01 | <0.01 | <0.01 | <0.01 | <0.01 | <0.01 | <0.0008 | 82 | 3.8 |
| 8 | <0.01 | <0.01 | <0.01 | <0.01 | <0.01 | <0.01 | <0.0008 | 84 | 4.1 |
| 9 | 0.77 | <0.01 | <0.01 | <0.01 | 0.012 | <0.01 | <0.0008 | 83 | 3.8 |
| 10 | 0.82 | <0.01 | <0.01 | <0.01 | <0.01 | <0.01 | <0.0008 | 81 | 3.7 |
| 11 | 1.00 | <0.01 | <0.01 | <0.01 | <0.01 | <0.01 | <0.0008 | 81 | 3.8 |
| 12 | <0.01 | <0.01 | <0.01 | 0.46 | <0.01 | <0.01 | <0.0008 | 92 | 4.4 |
| 13 | <0.01 | <0.01 | <0.01 | <0.01 | 0.019 | <0.01 | <0.0008 | 82 | 4.6 |
| 14 | 0.98 | <0.01 | <0.01 | <0.01 | <0.01 | <0.01 | <0.0008 | 87 | 3.7 |
| 15 | 0.52 | <0.01 | <0.01 | 0.12 | <0.01 | <0.01 | <0.0008 | 145 | 5.2 |
| 16 | <0.01 | 0.42 | <0.01 | <0.01 | <0.01 | 0.08 | <0.0008 | 77 | 4.6 |
| 17 | 1.09 | <0.01 | 0.07 | <0.01 | <0.01 | <0.01 | <0.0008 | 81 | 3.4 |
| 18 | 0.76 | <0.01 | <0.01 | <0.01 | <0.01 | <0.01 | <0.0008 | 82 | 3.0 |
| 19 | 0.35 | 0.18 | <0.01 | <0.01 | <0.01 | <0.01 | <0.0008 | 101 | 5.4 |
| 20 | 0.72 | 0.23 | <0.01 | <0.01 | <0.01 | <0.01 | <0.0008 | 76 | 3.7 |
| 21 | 0.69 | <0.01 | <0.01 | <0.01 | <0.01 | <0.01 | 0.0021 | 94 | 4.3 |
| 22 | <0.01 | <0.01 | <0.01 | <0.01 | <0.01 | 0.05 | <0.0008 | 81 | 3.4 |
| 23 | 0.88 | <0.01 | <0.01 | <0.01 | <0.01 | <0.01 | <0.0008 | 77 | 3.0 |
| 24 | 1.62 | <0.01 | <0.01 | <0.01 | <0.01 | <0.01 | <0.0008 | 78 | 4.0 |
| 25 | <0.01 | <0.01 | 0.02 | <0.01 | <0.01 | <0.01 | <0.0008 | 78 | 3.5 |
| 26 | 0.97 | 0.13 | <0.01 | <0.01 | <0.01 | <0.01 | <0.0008 | 81 | 3.8 |
| 27 | <0.01 | 0.55 | <0.01 | <0.01 | <0.01 | <0.01 | <0.0008 | 75 | 3.9 |
| 28 | 1.27 | <0.01 | 0.12 | <0.01 | <0.01 | <0.01 | <0.0008 | 83 | 3.4 |
| 29 | <0.01 | <0.01 | <0.01 | 0.72 | <0.01 | <0.01 | <0.0008 | 84 | 4.0 |
| 30 | <0.01 | <0.01 | <0.01 | <0.01 | <0.01 | <0.01 | 0.0031 | 85 | 3.4 |
| 31 | <0.01 | <0.01 | <0.01 | <0.01 | 0.011 | <0.01 | <0.0008 | 80 | 3.8 |

TABLE 2B

| Experiment No. | Heat input condition | Welding material No. | C | Si | Mn | Ni | Ti | N | O | Mo |
|---|---|---|---|---|---|---|---|---|---|---|
| 32 | IV | F1 | 0.07 | 0.60 | 1.96 | 1.12 | 0.052 | 0.0046 | 0.042 | <0.01 |
| 33 | II | F32 | 0.08 | 0.27 | 1.38 | 1.05 | 0.058 | 0.0048 | 0.048 | <0.01 |
| 34 | II | F33 | 0.09 | 2.02 | 1.67 | 1.22 | 0.078 | 0.0050 | 0.053 | <0.01 |
| 35 | III | F34 | 0.06 | 0.40 | 2.01 | 1.91 | 0.035 | 0.0046 | 0.051 | <0.01 |
| 36 | II | F35 | 0.07 | 0.38 | 1.82 | 2.05 | 0.157 | 0.0056 | 0.055 | <0.01 |
| 37 | II | F36 | 0.08 | 0.46 | 1.26 | 1.32 | 0.066 | 0.0041 | 0.048 | <0.01 |
| 38 | III | F37 | 0.07 | 0.41 | 1.46 | 1.61 | 0.068 | 0.0052 | 0.050 | 0.02 |
| 39 | II | F38 | 0.09 | 0.55 | 1.57 | 0.18 | 0.066 | 0.0049 | 0.049 | <0.01 |
| 40 | II | F39 | 0.08 | 0.27 | 1.91 | 1.72 | 0.128 | 0.0050 | 0.052 | 0.08 |

TABLE 2B-continued

| | | | | | | | | | |
|---|---|---|---|---|---|---|---|---|---|
| 41 | II | F40 | 0.01 | 0.29 | 1.67 | 2.88 | 0.058 | 0.0047 | 0.051 | 0.01 |
| 42 | II | F41 | 0.06 | 0.38 | 1.46 | 1.26 | 0.061 | 0.0053 | 0.051 | <0.01 |
| 43 | III | F42 | 0.07 | 0.12 | 0.88 | 1.88 | 0.072 | 0.0046 | 0.054 | <0.01 |
| 44 | II | F43 | 0.13 | 0.08 | 1.75 | 1.70 | 0.069 | 0.0048 | 0.108 | <0.01 |
| 45 | II | F44 | 0.07 | 1.98 | 1.33 | 1.67 | 0.075 | 0.0050 | 0.052 | 0.04 |
| 46 | II | F45 | 0.07 | 0.37 | 2.56 | 1.61 | 0.072 | 0.0060 | 0.049 | <0.01 |
| 47 | I | F46 | 0.08 | 0.42 | 1.61 | 3.56 | 0.069 | 0.0051 | 0.053 | <0.01 |
| 48 | III | F47 | 0.09 | 0.38 | 1.70 | 0.88 | 0.071 | 0.0160 | 0.049 | <0.01 |
| 49 | II | F48 | 0.07 | 0.37 | 1.49 | 1.33 | 0.071 | 0.0047 | 0.049 | 0.05 |
| 50 | III | F49 | 0.07 | 0.33 | 1.68 | 1.91 | 0.077 | 0.0062 | 0.050 | <0.01 |
| 51 | II | F50 | 0.08 | 0.33 | 1.48 | 1.46 | 0.067 | 0.0058 | 0.050 | <0.01 |
| 52 | I | F51 | 0.08 | 0.41 | 1.99 | 1.40 | 0.069 | 0.0048 | 0.050 | <0.01 |
| 53 | II | F52 | 0.08 | 0.36 | 2.05 | 1.25 | 0.071 | 0.0060 | 0.057 | 0.06 |
| 54 | II | F53 | 0.08 | 0.38 | 1.28 | 1.66 | 0.070 | 0.0049 | 0.028 | <0.01 |
| 55 | III | F54 | 0.09 | 0.61 | 1.54 | 2.15 | 0.069 | 0.0053 | 0.040 | <0.01 |
| 56 | II | F55 | 0.10 | 0.29 | 1.60 | 1.29 | 0.068 | 0.0055 | 0.058 | <0.01 |

| Experiment No. | Cr | V | Nb | Cu | Al | Zr | B | β value | α value |
|---|---|---|---|---|---|---|---|---|---|
| 32 | <0.01 | <0.01 | <0.01 | <0.01 | <0.01 | <0.01 | <0.0008 | 93 | 3.4 |
| 33 | <0.01 | <0.01 | <0.01 | <0.01 | <0.01 | <0.01 | <0.0008 | 70 | 2.8 |
| 34 | <0.01 | <0.01 | <0.01 | <0.01 | <0.01 | <0.01 | <0.0008 | 167 | 3.5 |
| 35 | 0.51 | <0.01 | <0.01 | <0.01 | <0.01 | <0.01 | <0.0008 | 88 | 3.9 |
| 36 | <0.01 | <0.01 | <0.01 | <0.01 | <0.01 | <0.01 | <0.0008 | 89 | 5.7 |
| 37 | <0.01 | <0.01 | <0.01 | <0.01 | <0.01 | <0.01 | <0.0008 | 81 | 3.1 |
| 38 | 1.23 | <0.01 | <0.01 | <0.01 | <0.01 | <0.01 | <0.0008 | 81 | 3.6 |
| 39 | <0.01 | <0.01 | <0.01 | <0.01 | <0.01 | <0.01 | <0.0008 | 82 | 2.2 |
| 40 | 0.72 | <0.01 | <0.01 | <0.01 | <0.01 | <0.01 | <0.0008 | 87 | 5.2 |
| 41 | <0.01 | <0.01 | <0.01 | <0.01 | <0.01 | <0.01 | <0.0008 | 72 | 4.9 |
| 42 | <0.01 | <0.01 | <0.01 | 0.12 | <0.01 | <0.01 | <0.0008 | 73 | 3.1 |
| 43 | <0.01 | <0.01 | <0.01 | <0.01 | <0.01 | <0.01 | <0.0008 | 60 | 3.3 |
| 44 | <0.01 | <0.01 | <0.01 | <0.01 | <0.01 | <0.01 | <0.0008 | 89 | 3.3 |
| 45 | 0.88 | <0.01 | <0.01 | <0.01 | <0.01 | <0.01 | <0.0008 | 159 | 3.7 |
| 46 | <0.01 | <0.01 | <0.01 | <0.01 | <0.01 | <0.01 | <0.0008 | 95 | 4.7 |
| 47 | <0.01 | <0.01 | <0.01 | <0.01 | <0.01 | <0.01 | <0.0008 | 106 | 5.6 |
| 48 | 0.37 | <0.01 | <0.01 | <0.01 | <0.01 | <0.01 | <0.0008 | 82 | 3.1 |
| 49 | <0.01 | <0.01 | <0.01 | <0.01 | <0.01 | <0.01 | <0.0008 | 78 | 3.5 |
| 50 | 2.06 | <0.01 | <0.01 | <0.01 | <0.01 | <0.01 | <0.0008 | 83 | 4.2 |
| 51 | <0.01 | 0.63 | <0.01 | <0.01 | <0.01 | <0.01 | <0.0008 | 79 | 3.4 |
| 52 | 0.49 | <0.01 | 0.16 | <0.01 | <0.01 | <0.01 | <0.0008 | 90 | 3.9 |
| 53 | <0.01 | <0.01 | <0.01 | 1.15 | <0.01 | <0.01 | <0.0008 | 89 | 3.9 |
| 54 | <0.01 | <0.01 | <0.01 | <0.01 | 0.022 | <0.01 | <0.0008 | 80 | 3.7 |
| 55 | <0.01 | <0.01 | <0.01 | <0.01 | <0.01 | 0.11 | <0.0008 | 104 | 4.3 |
| 56 | <0.01 | <0.01 | <0.01 | <0.01 | <0.01 | <0.01 | 0.0053 | 83 | 3.3 |

Subsequently, a tensile test specimen and a small test specimen for measuring the absorbed hydrogen content (a small test specimen for measurement of absorbed hydrogen content) were taken from the test specimen subjected to the heat cycle. FIG. 4 illustrates a shape of the tensile test specimen. FIG. 5 illustrates a shape of the small test specimen for measurement of absorbed hydrogen content. Such test specimens were used to evaluate the properties according to the following procedure, and to measure the number density of the Ti-containing oxide particles, the number density of the retained austenite particles, and the volume fraction of the retained austenite particles.

The resistance to hydrogen embrittlement was evaluated using not only the small test specimen of FIG. 5 but also a large test specimen of FIG. 6 described later. In the case of using each test specimen, the resistance to hydrogen embrittlement was evaluated by SSRT. This is because the SSRT makes it possible to measure the delayed failure susceptibility in a short time regardless of test environment, and to conduct sensible evaluation at a lower absorbed hydrogen amount.

[Evaluation of Hydrogen Embrittlement Susceptibility Using Small Test Specimen]

The small test specimen for measurement of absorbed hydrogen content of FIG. 5 was used, and a hydrogen charging condition was selected such that the amount of diffusible hydrogen was 1.5 to 3.0 ppm. The selected hydrogen charging condition was as follows.

Aqueous solution: (0.5 mol/L or 2.5 mol/L $H_2SO_4$)+(1 g/L-KSCN), (30 g/L-NaCl)+(1 g/L-KSCN).

Current density: 0.1 $A/dm^2$, 1.0 $A/dm^2$, and 5.0 $A/dm^2$.

Charging time: 24 hr.

The amount of diffusible hydrogen was measured using a temperature-programmed desorption analyzer incorporating a quadrupole mass spectrometer (from NICHIDEN ANELVA K.K.), and was determined as an amount of hydrogen discharged during heating up to 300° C. at a heating rate of 12° C./min.

The small test specimen was subjected to the hydrogen charging under the above-described condition, and was then electrogalvanized in the following procedure to prevent escape of hydrogen.

Aqueous solution: (350 g/L-$ZnSO_4 \cdot 7H_2O$)+(20.6 g/L-$H_2SO_4$(97%))+(60 g/L-$Na_2SO_4$).

Bath temperature: 60° C.

Current density: 50 $A/dm^2$.

Electrogalvanizing time: 3 min.

Subsequently, the SSRT test was carried out at a crosshead speed of $5.0 \times 10^{-3}$ mm/min (strain speed of $6.94 \times 10^{-6}$ per second). A hydrogen embrittlement susceptibility index S (%) was calculated by Formula (5) while breaking elongation of a non-hydrogen-charged material was denoted as $E_0$, and breaking elongation of a hydrogen-charged material was denoted as $E_h$, and a material having a hydrogen embrittlement susceptibility index of less than 60% was determined to be excellent in resistance to hydrogen embrittlement in the case of the small test specimen.

$$S = (1 - E_h / E_0) \times 100(\%) \quad (5)$$

[Evaluation of Tensile Strength TS]

A 20° V-shaped groove was formed on a SM490A steel plate 20 mm in thickness, and gas shielded arc welding was performed under the following condition using the welding materials listed in Tables 1A and 1B.

(Welding Condition)

Shield gas: 20 vol % $CO_2$-80 vol % Ar mixed gas.

Current, voltage, and welding speed: 270 A, 29 V, and 4.5 mm/sec.

Heat input: 1.74 kJ/mm (the condition (2) described above).

Preheating/interpass temperature: 105 to 150° C.

Lamination: 8 layers/17 passes.

A tensile test specimen as illustrated in FIG. 4 according to JIS-Z2202 was taken from each of the weld metals prepared in this way, and was subjected to a tensile test. In Example 1, a weld metal showing a tensile strength TS of more than 780 MPa was specified to be acceptable.

[Measurement of Low-Temperature Toughness]

A Charpy impact test specimen (JIS Z 31114 V-notch test specimen) was taken perpendicularly to a welding line direction from the center of thickness of the weld metal prepared for the measurement of tensile strength, and was subjected to measurement of impact absorbed energy $vE_{-40}$ at −40° C. according to the procedure of JIS Z 2242. A weld metal having an average of three measured values of more than 85 J was determined to be excellent in low-temperature toughness.

[Measurement of Number Density of Ti-Containing Oxide Particles]

The number density of the Ti-containing oxide particles (in detail, oxide particles each containing 20 mass % or more Ti and having a circle-equivalent diameter of 0.15 to 1.0 µm) was measured in the following manner.

A round-bar test specimen 5 mm in diameter was taken from the final pass of each weld metal prepared for the SSRT test (see the clause of "Preparation of Weld Metal" described above) and sliced, and such a sliced cross section of the test specimen was mirror-polished. Subsequently, 1000× images were photographed by a light microscope in two visual fields on the cross section. Oxide particles having a circle-equivalent diameter of 0.15 to 1.0 µm were selected with image analysis software ("Image-Pro Plus" from Media Cybernetics), and a composition at the center of each photographed oxide was analyzed by SEMEDS (Energy-dispersive X-ray spectroscopy). Among the detected elements, an analyzed value (mass percent) of Ti was normalized by the total of analyzed values (mass percent) of Si, S, Ti, Mn, Al, Zr, and Mg, thereby Ti concentration (mass percent) in the oxide particle was calculated, so that the number density of the Ti-containing oxide particles was calculated, each oxide particle containing 20 mass % or more Ti and having a circle-equivalent diameter of 0.15 to 1.0 µm. Since Mn is contained in almost all oxides, the Ti-containing oxide identified in the above-described manner also contained Mn.

[Measurement of Number Density of Retained Austenite Particles]

Each sample subjected to measurement of the number density of the Ti-containing oxide particles was corroded by a Repera reagent, and 1000× images of the sample were photographed by a light microscope in two visual fields. White corrosion contrast in the retained austenite was analyzed by image analysis software (the same software as described above) to calculate the number density of the retained austenite particles each having a circle-equivalent diameter of more than 0.15 µm.

[Measurement of Volume Fraction of Retained Austenite Particles]

Each sample subjected to measurement of the number density of the Ti-containing oxide particles was subjected to surface electro-polishing, and was then subjected to X-ray diffraction measurement by a two-dimensional micro-part X-ray diffractometer from Rigaku Corporation. An integrated intensity ratio was obtained on each of peaks of the lattice planes of (110), (200), (211), and (220) of the ferrite phase, and on each of peaks of the lattice planes of (111), (200), (220), and (311) of the retained austenite phase. Based on such an integrated intensity ratio, the volume fraction of each of the lattice planes of (111), (200), (220), and (311) of the retained austenite phase was calculated, and an average of such volume fractions was obtained and defined as "volume fraction of retained austenite".

Furthermore, in Example 1, the resistance to hydrogen embrittlement in the case of the large test specimen of FIG. 6 was evaluated as follows.

[Evaluation of Hydrogen Embrittlement Susceptibility Using Large Test Specimen]

Figure 6A:
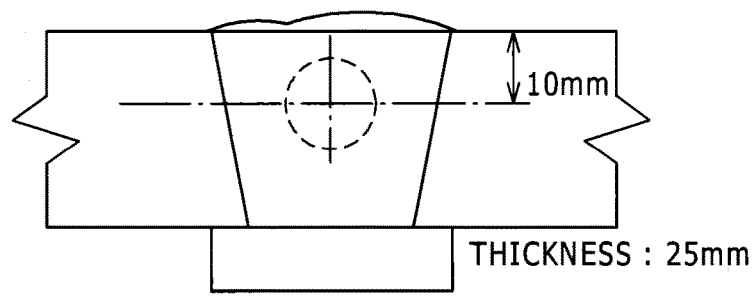
FIG. 6 includes schematic illustrations showing a shape and a sampling position of a large test specimen for measurement of absorbed hydrogen content by SSRT.

An SM490A steel plate (25 mm in thickness) having a groove shape as illustrated in FIG. 6(a) was prepared as a base metal steel plate. Gas shielded arc welding was then carried out under the following condition using the welding materials listed in Tables 1A and 1B.

(Welding Condition)

Shield gas: 20 vol % $CO_2$-80 vol % Ar mixed gas.

Current, voltage, and welding speed: 280 A, 29 V, and 8.0 mm/sec.

Heat Input Condition:

(1) 1.0 kJ/mm (280 A, 29 V, and 8.0 mm/sec).

Preheating/interpass temperature: 50° C.

Lamination: 8 layers/16 passes.

Figure 6B:
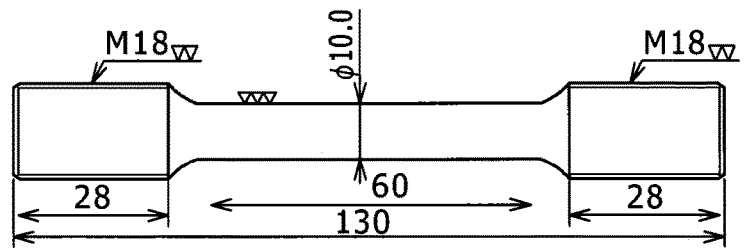

With the weld metal prepared in this way, a large test specimen illustrated in FIG. 6(b) was taken from a round frame portion in FIG. 6(a) in a direction parallel to a welding direction, and was subjected to hydrogen charging under the following condition.

(Hydrogen Charging Condition)

Aqueous solution: (30 g/L-NaCl)+(1 g/L-KSCN).

Current density: 0.1 A/dm$^2$.

Charging time: 100 hr.

The tensile test specimen was subjected to the hydrogen charging under the above-described condition, and was then electrogalvanized to prevent escape of hydrogen. The electrogalvanizing condition was the same as that in the above-described case of using the small test specimen.

Subsequently, the SSRT test was carried out at a crosshead speed of $3.0 \times 10^{-2}$ mm/min (strain speed of $6.94 \times 10^{-6}$ per second). A hydrogen-charged material having a breaking elongation of more than 2.0% was determined to be excellent in resistance to hydrogen embrittlement in the case of the large test specimen.

Tables 3A and 3B each collectively show results of such evaluation.

TABLE 3A

| | | | Retained austenite particles (as welded zone) | | | Resistance to hydrogen embrittlement | | | |
|---|---|---|---|---|---|---|---|---|---|
| Experiment No. | Heat input condition | Welding material No. | Number [number/mm$^2$] | Volume fraction [%] | Ti-containing oxide particles [number/mm$^2$] | Hydrogen embrittlement susceptibility index S [%] | Breaking elongation [%] | Tensile strength TS [MPa] | Low-temperature toughness vE$_{-40}$ [J] |
| 1 | II | F1 | 2786 | 4.7 | 4643 | 45 | 2.9 | 803 | 65 |
| 2 | II | F2 | 5740 | 4.9 | 9708 | 25 | 4.8 | 802 | 73 |
| 3 | II | F3 | 5994 | 4.6 | 12325 | 25 | 4.7 | 848 | 81 |
| 4 | I | F4 | 2533 | 5.0 | 4474 | 45 | 2.2 | 869 | 61 |
| 5 | III | F5 | 2617 | 5.8 | 3799 | 50 | 2.4 | 871 | 70 |
| 6 | II | F6 | 2701 | 4.7 | 4896 | 40 | 2.8 | 903 | 70 |
| 7 | II | F7 | 6500 | 4.8 | 12747 | 25 | 5.3 | 806 | 105 |
| 8 | I | F8 | 6838 | 4.8 | 13676 | 20 | 5.2 | 805 | 107 |
| 9 | III | F9 | 4052 | 4.7 | 8188 | 40 | 3.2 | 833 | 97 |
| 10 | II | F10 | 6669 | 4.9 | 13507 | 25 | 4.5 | 841 | 105 |
| 11 | II | F11 | 7682 | 5.3 | 13085 | 15 | 5.9 | 852 | 102 |
| 12 | I | F12 | 3799 | 5.2 | 7429 | 45 | 3.0 | 803 | 79 |
| 13 | I | F13 | 2701 | 4.5 | 5149 | 50 | 2.6 | 792 | 98 |
| 14 | I | F14 | 5656 | 5.2 | 10214 | 45 | 2.6 | 906 | 89 |
| 15 | II | F15 | 2870 | 7.0 | 3377 | 55 | 2.3 | 955 | 51 |
| 16 | II | F16 | 2786 | 5.3 | 5318 | 40 | 5.2 | 783 | 82 |
| 17 | I | F17 | 6753 | 4.8 | 13338 | 15 | 6.3 | 851 | 96 |
| 18 | II | F18 | 2955 | 4.9 | 4305 | 45 | 2.7 | 795 | 49 |
| 19 | I | F19 | 7429 | 4.7 | 15870 | 30 | 3.6 | 888 | 78 |
| 20 | II | F20 | 2870 | 4.6 | 7429 | 30 | 4.1 | 786 | 108 |
| 21 | III | F21 | 5994 | 4.6 | 13422 | 25 | 4.4 | 861 | 81 |
| 22 | II | F22 | 5572 | 4.9 | 9539 | 40 | 3.0 | 854 | 86 |
| 23 | II | F23 | 7682 | 4.5 | 16799 | 20 | 5.8 | 794 | 74 |
| 24 | II | F24 | 3714 | 5.0 | 6753 | 50 | 2.4 | 856 | 91 |
| 25 | I | F25 | 5149 | 4.6 | 11059 | 25 | 4.6 | 802 | 96 |
| 26 | II | F26 | 4221 | 4.1 | 15702 | 40 | 2.1 | 855 | 91 |
| 27 | III | F27 | 3799 | 4.1 | 12409 | 55 | 2.5 | 936 | 89 |
| 28 | II | F28 | 6162 | 4.5 | 13085 | 50 | 2.2 | 941 | 88 |
| 29 | III | F29 | 4643 | 5.1 | 7682 | 50 | 2.4 | 945 | 90 |
| 30 | II | F30 | 4305 | 4.8 | 7851 | 50 | 2.4 | 936 | 93 |
| 31 | II | F31 | 3883 | 4.5 | 8104 | 40 | 3.9 | 813 | 101 |

TABLE 3B

| | | | Retained austenite particles (as welded zone) | | | Resistance to hydrogen embrittlement | | | |
|---|---|---|---|---|---|---|---|---|---|
| Experiment No. | Heat input condition | Welding material No. | Number [number/mm$^2$] | Volume fraction [%] | Ti-containing oxide particles [number/mm$^2$] | Hydrogen embrittlement susceptibility index S [%] | Breaking elongation [%] | Tensile strength TS [MPa] | Low-temperature toughness vE$_{-40}$ [J] |
| 32 | IV | F1 | 2026 | 3.9 | 4474 | 80 | 1.4 | 800 | 69 |
| 33 | II | F32 | 2617 | 3.8 | 14013 | 65 | 1.9 | 758 | 82 |
| 34 | II | F33 | 1857 | 7.2 | 2448 | 90 | 1.2 | 989 | 51 |
| 35 | III | F34 | 2448 | 3.8 | 4727 | 80 | 1.4 | 821 | 94 |
| 36 | II | F35 | 6162 | 4.7 | 13422 | 60 | 1.6 | 974 | 75 |
| 37 | II | F36 | 2026 | 3.7 | 4812 | 70 | 1.8 | 808 | 80 |
| 38 | III | F37 | 2617 | 3.9 | 6162 | 65 | 1.2 | 893 | 93 |
| 39 | II | F38 | 1942 | 3.9 | 4052 | 65 | 2.3 | 767 | 70 |
| 40 | II | F39 | 6838 | 4.5 | 16883 | 30 | 1.8 | 875 | 101 |
| 41 | II | F40 | 3968 | 3.7 | 14435 | 65 | 1.9 | 745 | 83 |
| 42 | II | F41 | 2533 | 3.6 | 7682 | 65 | 1.7 | 776 | 78 |
| 43 | III | F42 | 3461 | 3.8 | 11987 | 60 | 1.9 | 744 | 88 |
| 44 | II | F43 | 2786 | 3.2 | 17728 | 90 | 1.1 | 933 | 86 |
| 45 | II | F44 | 1604 | 7.3 | 2110 | 95 | 0.8 | 991 | 75 |
| 46 | II | F45 | 5149 | 4.7 | 11481 | 80 | 1.4 | 983 | 92 |
| 47 | I | F46 | 3968 | 4.8 | 6500 | 75 | 1.5 | 972 | 66 |
| 48 | III | F47 | 3461 | 4.9 | 7007 | 80 | 1.3 | 981 | 71 |
| 49 | II | F48 | 3292 | 4.6 | 6922 | 45 | 1.9 | 849 | 98 |
| 50 | III | F49 | 5403 | 4.8 | 11481 | 65 | 1.6 | 981 | 92 |
| 51 | II | F50 | 5487 | 4.7 | 10552 | 70 | 1.6 | 987 | 87 |
| 52 | I | F51 | 5909 | 4.8 | 11059 | 80 | 1.4 | 994 | 90 |
| 53 | II | F52 | 5318 | 4.6 | 11818 | 75 | 1.2 | 981 | 91 |

TABLE 3B-continued

| | | | Retained austenite particles (as welded zone) | | Resistance to hydrogen embrittlement | | | |
|---|---|---|---|---|---|---|---|---|
| | | | | | | Hydrogen | Tensile | Low-temperature |
| Experiment No. | Heat input condition | Welding material No. | Number [number/mm$^2$] | Volume fraction [%] | Ti-containing oxide particles [number/mm$^2$] | embrittlement susceptibility index S [%] | Breaking elongation [%] | strength TS [MPa] | toughness vE$_{-40}$ [J] |
| 54 | II | F53 | 1857 | 4.8 | 2533 | 65 | 1.8 | 815 | 88 |
| 55 | III | F54 | 2026 | 5.3 | 3039 | 70 | 1.8 | 829 | 66 |
| 56 | II | F55 | 5656 | 4.5 | 13422 | 85 | 1.5 | 982 | 86 |

The following consideration can be made from such results.

Nos. 1 to 31 in Table 3A are examples satisfying the requirements defined in the invention, in each of which a weld metal having excellent resistance to hydrogen embrittlement in the case of each of the small and large test specimens was produced even at a high strength of more than 780 MPa. In detail, welding was performed at the appropriate heat input condition (each of (1) to (3)) using each of the appropriate welding materials listed in Table 1A. Hence, the chemical composition and the δ value of each weld metal (see Table 2A) and the number density and the volume fraction of the retained austenite particles (see Table 3A) were all appropriately controlled. As a result, weld metals each having the desired properties were produced.

Among the weld metals, weld metals, having the number density of the Ti-containing oxide particles of 5000 or more per square millimeter (Nos. 2, 3, 7 to 14, 16, 17, and 19 to 31), tended to be further improved in resistance to hydrogen embrittlement in the case of each of the small and large test specimens since welding materials each having an appropriately controlled B value (see Table 1A) were used therein.

Furthermore, among such examples of the weld metals, each of Nos. 7 to 11, 13, 14, 17, 20, 22, and 24 to 31 was appropriately controlled in each of the amounts of Si and Ni in the weld metal and in α value (see Table 2A), and therefore had excellent low-temperature toughness (vE$_{-40}$> 85 J).

In contrast, Nos. 32 to 56 in Table 3B are examples that each dissatisfy at least one of the requirements defined in the invention, and do not show the desired properties.

No. 32 is an example in which welding was carried out at a heat input condition (IV) of large heat input while an appropriate welding material F1 was used. As a result, the number density and the volume fraction of the retained austenite particles in the weld metal became smaller, resulting in lowering of the resistance to hydrogen embrittlement of each of the small and large test specimens. In addition, since the amount of Si as the index of the low-temperature toughness was not appropriate, the desired low-temperature toughness was not shown.

No. 33 is an example using a welding material F32 that is small in amount of Si (total amount of Si) and small in amount of metal Si, and has the A value out of the defined range. As a result, the volume fraction of the retained austenite particles in the weld metal became smaller, resulting in lowering of the resistance to hydrogen embrittlement of each of the small and large test specimens. Furthermore, since the β value as the index of high strength was small, strength was lower. In addition, since the α value as the index of low-temperature toughness was small, the desired low-temperature toughness was not shown.

No. 34 is an example using a welding material F33 that is large in amount of Si (total amount of Si), and has the B value out of the defined range. As a result, the weld metal contained a larger amount of Si, and the number density of the retained austenite particles in the weld metal became smaller, resulting in lowering of the resistance to hydrogen embrittlement of each of the small and large test specimens. In addition, since the amount of Si as the index of low-temperature toughness was not appropriate, the desired low-temperature toughness was not shown.

No. 35 is an example using a welding material F34 that is small in amount of Ti (the total amount of Ti). As a result, the weld metal contained a small amount of Ti, and the number density and the volume fraction of the retained austenite particles in the weld metal became smaller, resulting in lowering of the resistance to hydrogen embrittlement of each of the small and large test specimens.

No. 36 is an example using a welding material F35 that is large in amount of Ti (total amount of Ti). As a result, the weld metal contained a large amount of Ti, resulting in lowering of the resistance to hydrogen embrittlement of each of the small and large test specimens. In addition, since the amount of Ni as the index of low-temperature toughness was not appropriate, the desired low-temperature toughness was not shown.

No. 37 is an example using a welding material F36 that is small in amount of Al (total amount of Al). As a result, the number density and the volume fraction of the retained austenite particles in the weld metal became smaller, resulting in lowering of the resistance to hydrogen embrittlement of each of the small and large test specimens. In addition, since the α value as the index of low-temperature toughness was not appropriate, the desired low-temperature toughness was not shown.

No. 38 is an example using a welding material F37 that is small in amount of Zr (total amount of Zr). As a result, the volume fraction of the retained austenite particles in the weld metal became smaller, resulting in lowering of the resistance to hydrogen embrittlement of each of the small and large test specimens.

No. 39 is an example using a welding material F38 that is small in amount of Mg (total amount of Mg). As a result, the weld metal contained a small amount of Ni, and the number density and the volume fraction of the retained austenite particles in the weld metal became smaller, resulting in lowering of the resistance to hydrogen embrittlement of each of the small and large test specimens. Furthermore, since the weld metal contained a small amount of Ni, strength was lowered. In addition, since the amount of Ni as the index of low-temperature toughness was not appropriate, the desired low-temperature toughness was not shown.

No. 40 is an example using a welding material F39 that is large in amount of Mo (the total amount of Mo). As a result, the resistance to hydrogen embrittlement of the large test specimen was lowered.

No. 41 is an example using a welding material F40 that is small in amount of Si in a form of metal Si. As a result, the weld metal contained a small amount of C, and the volume fraction of the retained austenite particles in the weld metal became smaller, resulting in lowering of the resistance to hydrogen embrittlement of each of the small and large test specimens. Furthermore, since the β value as the index of high strength was small, strength was lower.

No. 42 is an example using a welding material F41 that is large in amount of $SiO_2$. As a result, the volume fraction of the retained austenite particles in the weld metal became smaller, resulting in lowering of the resistance to hydrogen embrittlement of each of the small and large test specimens. Furthermore, since the B value as the index of high strength was small, strength was lower. In addition, since the α value as the index of low-temperature toughness was not appropriate, the desired low-temperature toughness was not shown.

No. 43 is an example using a welding material F42 having an inappropriate A value. As a result, the weld metal contained a small amount of Mn, and the volume fraction of the retained austenite particles in the weld metal became smaller, resulting in lowering of the resistance to hydrogen embrittlement of each of the small and large test specimens. Furthermore, since the β value as the index of high strength was small, strength was lower.

No. 44 is an example using a welding material F43 that has an inappropriate A value, and is small in amount of Si in a form of metal Si. As a result, the weld metal contained a large amount of C, a small amount of Si, and a large amount of O, and the volume fraction of the retained austenite particles in the weld metal became smaller, resulting in lowering of the resistance to hydrogen embrittlement of each of the small and large test specimens.

No. 45 is an example using a welding material F44 having an inappropriate B value. As a result, the number density of the retained austenite particles in the weld metal became smaller, resulting in lowering of the resistance to hydrogen embrittlement of each of the small and large test specimens.

No. 46 is an example using a welding material F45. In this example, the weld metal contained a large amount of Mn and had extremely increased strength, resulting in lowering of the resistance to hydrogen embrittlement of each of the small and large test specimens.

No. 47 is an example using a welding material F46. In this example, the weld metal contained a large amount of Ni and had extremely increased strength, resulting in lowering of the resistance to hydrogen embrittlement of each of the small and large test specimens. In addition, since the amount of Ni as the index of low-temperature toughness was not appropriate, the desired low-temperature toughness was not shown.

No. 48 is an example using a welding material F47. In this example, the weld metal contained a large amount of N and had extremely increased strength, resulting in lowering of the resistance to hydrogen embrittlement in each of the small and large test specimens. In addition, since the α value as the index of low-temperature toughness was not appropriate, the desired low-temperature toughness was not shown.

No. 49 is an example using a welding material F48 having a large amount of Mo. As a result, the weld metal contained a large amount of Mo, and the resistance to hydrogen embrittlement of the large test specimen was lowered.

No. 50 is an example using a welding material F49. In this example, the weld metal contained a large amount of Cr and had extremely increased strength, resulting in lowering of the resistance to hydrogen embrittlement of each of the small and large test specimens.

No. 51 is an example using a welding material F50. In this example, the weld metal contained a large amount of V and had extremely increased strength, resulting in lowering of the resistance to hydrogen embrittlement of each of the small and large test specimens.

No. 52 is an example using a welding material F51. In this example, the weld metal contained a large amount of Nb and had extremely increased strength, resulting in lowering of the resistance to hydrogen embrittlement of each of the small and large test specimens.

No. 53 is an example using a welding material F52. In this example, the weld metal contained a large amount of Mo and a large amount of Cu, and had extremely increased strength, resulting in lowering of the resistance to hydrogen embrittlement of each of the small and large test specimens.

No. 54 is an example using a welding material F53. In this example, the weld metal contained a larger amount of Al. Furthermore, the weld metal had a lower oxygen concentration, and contained a smaller amount of O due to the increased amount of Al as the strong oxidizing element. Consequently, the number density of the retained austenite particles in the weld metal became smaller, resulting in lowering of the resistance to hydrogen embrittlement of each of the small and large test specimens.

No. 55 is an example using a welding material F54 in which the amount of Zr exceeds a preferred upper limit. As a result, the weld metal contained a large amount of Zr, and the number density of the retained austenite particles in the weld metal became smaller, resulting in lowering of the resistance to hydrogen embrittlement of each of the small and large test specimens. In addition, since the amount of each of Si and Ni as the index of low-temperature toughness was not appropriate, the desired low-temperature toughness was not shown.

No. 56 is an example using a welding material F55 of which the amount of B exceeds a preferred upper limit. As a result, the weld metal contained a large amount of B, resulting in lowering of the resistance to hydrogen embrittlement of each of the small and large test specimens.

While the present invention has been described specifically with reference to the specific embodiment, it will be apparent to those skilled in the art that various modifications or alterations may be made without departing from the spirit and the scope of the invention.

The present application is based on Japanese patent application filed on Feb. 27, 2012 (Japanese Patent Application No. 2012-040603), the content of which is incorporated herein for reference.

INDUSTRIAL APPLICABILITY

The weld metal of the invention is excellent in resistance to hydrogen embrittlement and in low-temperature toughness, and is preferred for offshore structures.

The invention claimed is:
1. A weld metal, comprising:
iron;
C: from 0.02 to 0.12 mass %;
Si: from 0.10 to 2.00 mass %;
Mn: from 0.90 to 2.5 mass %;
Ni: from 0.20 to 3.5 mass %;
Ti: from 0.040 to 0.15 mass %;

N: a positive amount less than or equal to 0.015 mass %; and

O: from 0.030 to 0.10 mass %;

wherein the weld metal is obtained from a wire, which, based on a total mass of the wire, comprises Si in a total content of from 0.35% to 2.5%;

Si in a form of metal Si in a content of 0.25% or more;

$SiO_2$ in a content of 0.25% or less;

Ti in a total content of from 2.5% to 4.5%;

Al in a total content of 0.10% or more;

Zr in a total content of 0.035% or more; and

Mg in a total content of 0.4% or more, the wire has a value A calculated by Expression (a) of 0.30 or more and a ratio B calculated by Expression (b) of more than 4.0:

$$A\ value = Si - [Si/(Ti + 2 \times Al + 2 \times Zr + 3.5 \times Mg)] \tag{a}$$

$$B\ ratio = (Mn + Ti)/Si \tag{b}$$

in the Expression (a) and the Expression (b), Si, Ti, Al, Zr, Mg, and Mn represent a total content of Si, Ti, Al, Zr, Mg, and Mn in the wire, respectively, retained austenite particles exist at a density of greater than or equal to 2500 per square millimeter and in a volume fraction of greater than or equal to 4.0%, and a β value represented by Formula (1) is greater than or equal to 75:

$$\beta\ value = 320 \times [C] + 50 \times [Si] + 15 \times [Mn] + 10 \times [Ni] + 28 \times [Mo] \tag{1}$$

wherein [C], [Si], [Mn], [Ni], and [Mo] are the mass percent of C, Si, Mn, Ni, and Mo, respectively.

2. The weld metal of claim 1, comprising:

Mo: less than 0.05 mass %.

3. The weld metal of claim 1, wherein

Si: from 0.10 to 0.5 mass %,

Ni: from 1.0 to 2.0 mass %, and an α value defined by Formula (2) is greater than or equal to 3.2:

$$\alpha\ value = [Mn] + [Ni] + (2 \times [Mo]) + (16 \times [Ti]) - (12 \times [O]) \tag{2}$$

wherein [Mn], [Ni], [Mo], [Ti], and [O] are the mass percent of Mn, Ni, Mo, Ti, and O, respectively.

4. The weld metal of claim 1, wherein oxide particles exist at a density of greater than or equal to 5000 per square millimeter, with each particle containing greater than or equal to 20 mass % of Ti and having a circle-equivalent diameter of from 0.15 to 1.0 μm.

5. The weld metal of claim 1, further comprising: at least one selected from the group consisting of Cr: a positive amount less than or equal to 2.0 mass %, V: a positive amount less than or equal to 0.60 mass %, Nb: a positive amount less than or equal to 0.15 mass %, Cu: a positive amount less than or equal to 1.0 mass %, Al: a positive amount less than or equal to 0.020 mass %, Zr: a positive amount less than or equal to 0.10 mass %, and B: a positive amount less than or equal to 0.0050 mass %.

6. The weld metal of claim 1, wherein

C: from 0.04 to 0.08 mass %;

Si: from 0.28 to 0.5 mass %;

Mn: from 1.5 to 2.0 mass %;

Ni: from 1.0 to 2.8 mass %;

Ti: from 0.055 to 0.08 mass %;

N: a positive amount less than or equal to 0.006 mass %; and

O: from 0.040 to 0.060 mass %.

7. The weld metal of claim 1, further comprising:

Cr: a positive amount less than or equal to 2.0 mass %.

8. The weld metal of claim 1, further comprising:

V: a positive amount less than or equal to 0.60 mass %.

9. The weld metal of claim 1, further comprising:

Nb: a positive amount less than or equal to 0.15 mass %.

10. The weld metal of claim 1, further comprising:

Cu: a positive amount less than or equal to 1.0 mass %.

11. The weld metal of claim 1, further comprising:

Al: a positive amount less than or equal to 0.020 mass %.

12. The weld metal of claim 1, further comprising:

Zr: a positive amount less than or equal to 0.10 mass %.

13. The weld metal of claim 1, further comprising:

B: a positive amount less than or equal to 0.0050 mass %.

14. The weld metal of claim 1, wherein the β value is 160 or less.

* * * * *